United States Patent
Duguay et al.

(10) Patent No.: US 6,266,694 B1
(45) Date of Patent: *Jul. 24, 2001

(54) ARCHITECTURE FOR NETWORK MANAGER

(75) Inventors: Daniel Duguay, Kanata; Dennis Wee, Ottawa; Roland Wippel, Ottawa; Yves Do Rego, Ottawa; Mary O'Neill, Dunrobin; Fraser Fulford, Stittsville; Michel Pedneault, Nepean, all of (CA); Joseph Kairouz, Somerset, NJ (US)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/878,636

(22) Filed: Jun. 19, 1997

(51) Int. Cl.[7] .............................. G06F 15/16; G06F 13/38; G06F 15/17
(52) U.S. Cl. .................... 709/223; 709/224; 709/227; 709/228; 709/239
(58) Field of Search .................... 370/221, 222, 370/228, 410; 709/223, 224, 227, 228, 239

(56) References Cited

U.S. PATENT DOCUMENTS

| | | | | |
|---|---|---|---|---|
| 5,021,949 | * | 6/1991 | Morten et al. | 709/231 |
| 5,077,554 | * | 12/1991 | Orita et al. | . |
| 5,261,044 | | 11/1993 | Dev et al. | 395/159 |
| 5,303,243 | * | 4/1994 | Anezaki | 709/223 |
| 5,375,199 | | 12/1994 | Harrow et al. | 395/159 |
| 5,448,724 | | 9/1995 | Hayashi | 395/182.02 |
| 5,544,314 | * | 8/1996 | Fuchsreiter et al. | 709/224 |
| 5,561,769 | * | 10/1996 | Kumar et al. | 709/202 |
| 5,651,006 | * | 7/1997 | Fujino et al. | 395/200.53 |
| 5,737,526 | * | 4/1998 | Periasamy et al. | 395/200.71 |
| 5,742,762 | * | 4/1998 | Scholl et al. | 709/223 |
| 5,758,083 | * | 5/1998 | Singh et al. | 395/200.53 |
| 5,768,522 | * | 6/1998 | Nicolas | 709/224 |
| 5,774,669 | * | 6/1998 | George et al. | 709/224 |
| 5,825,752 | * | 10/1998 | Fujimori et al. | 370/260 |
| 5,828,847 | * | 10/1998 | Gehr et al. | 395/200.69 |
| 5,872,931 | * | 2/1999 | Chivaluri | 709/223 |
| 5,913,036 | * | 6/1999 | Brownmiller et al. | 709/224 |
| 5,928,328 | * | 7/1999 | Komori et al. | 709/223 |
| 6,000,045 | * | 12/1999 | Lewis | 709/223 |

OTHER PUBLICATIONS

Vassila, A. et al., "Introducing Active Managed Objects For Effective and Autonomous Distributed Management", 3rd Int. Conf. On Intelligence in Broadband Service & Networks, Heraklion, Crete, Oct. 16–19, 1995, Proceedings, No. Conf. 3, Oct. 16, 1995, pp. 415–429.

(List continued on next page.)

*Primary Examiner*—Mark H. Rinehart
*Assistant Examiner*—Almari Romero
(74) *Attorney, Agent, or Firm*—Aprillia U. Diaconescu

(57) ABSTRACT

A distributed network management architecture, where a plurality of network managers share information about network elements by building the necessary infrastructure to discover alternate routes to element controllers when possible. A large number of network elements and operation controllers or managed object agents spans are simultaneously accessible to multiple graphical network browser instances on physical workstations. Each network manager can manage an element controller directly, through a direct connection, or indirectly, through an indirect connection to a second network manager which directly manages that element controller. As well, a plurality of telecommunication networks can be federated for transparently increasing the number of users and the reliability of each network. By allowing each network manager to be configured individually, more flexibility over both engineering and survivability is achieved.

52 Claims, 15 Drawing Sheets

OTHER PUBLICATIONS

Siegl, M.R. et al., "Hierarchical Network Management: A Concept and Its Prototype in SNMPV2", Computer Networks and ISDN Systems, vol. 28, No. 4, Feb. 1, 1996, pp. 441–452.

Shim, Y.C., "Developing a Managed System in a Telecommunication Management Network", 1996 IEEE International Conference on Communications (ICC), Converging Technologies for Tomorrow's Applications, Dallas, Jun. 23–27, 1996, vol. 1, pp. 17–21.

Hac, A., "Resource management in a hierarchical network", Sy Record., SBT/IEEE International, pp. 563–567, Sep. 1990.*

Simon, S., "Peer–to peer network management in an IBM SNA nework", IEEE Network, vol. 5, issue 2, pp. 30–34, Mar. 1991.*

Ishida et al., "Minimum number of links needed for fault–tolerance in cluster–based network", International Symposium on Fault Tolerant Systems, pp. 114–119, Sep. 1991.*

* cited by examiner

ARCHITECTURE FOR NETWORK MANAGER

BACKGROUND OF THE INVENTION

1. Field of the Invention

The invention is directed to a network architecture and more particularly to a distributed network management architecture sharing information about network elements and providing increased survivability.

2. Background Art

Network management has become increasingly complex in today's telecommunications networks. Currently, network managers directly managed element controllers, which could be operation controllers (OPCs) or managed object agents (MOAs). Intelligent network elements (NE) are software driven in every aspect from maintenance to control, to release upgrades. The management of these NEs requires a robust and highly efficient system which can process a large volume of data over a geographically distributed network. This highly efficient system must also provide network management tools for simplifying day to day operations and reduce service down-time.

In the current network architecture, a network manager (NM) generally manages a maximum number of 75 element controller pairs, an element controller supports up to four NMs, and an OPC can control up to 1200 network elements or networks. In addition, OPCs are limited processors that cannot handle more than four connections.

As customer transmission networks grow, so does the demand for the number of users who need access to the system. As such, the number of NEs becomes larger and they are more geographically dispersed. All these changes cause significant technological challenges to the nature of network management. No longer can the entire customer network be managed centrally from a single point, rather the need for distributed network management, locally and geographically, is a growing requirement. Additionally, customers wish to divide their network into different regions based on political or business boundaries. Quite frequently two or more regions overlap, presenting a challenge given the current engineering limits.

U.S. Pat. No. 5,375,199 (Harrow et al. issued on Dec. 20, 1994 to Digital Equipment Corporation) discloses a method and device for monitoring performance of a computer system, including a graphical user interface (GUI). The GUI is designed to provide historical or real time information on the system and also allows the user to interact with the information being viewed.

U.S. Pat. No. 5,261,044 (Dev et al. issued on Nov. 9, 1993 to Cabletron Systems, Inc.) relates to a network management system which performs fault isolation. The information relating to the network is displayed, the network entities being represented by icons. The user may select a prescribed area of an icon to obtain details regarding a particular aspect of the network entity represented by the respective icon.

However, these patents are not concerned with a distributed network management architecture designed for sharing information about the network elements and for allowing each NM to be re/configured individually to manage the element controllers on a per span basis.

SUMMARY OF THE INVENTION

An object of this invention is to provide an architecture and core network manager changes that allow a large number of network elements and operation controllers (OPCs), or managed object agents (MOAs) spans to be simultaneously accessible to multiple graphical network browser (GNB) instances on physical workstations.

It is another object of this invention to provide an increased survivability of network to network manager workstation communication in case of network outages, by building the necessary infrastructure to discover alternate routes to controllers when possible.

Accordingly, the invention comprises a method of managing an element controller of a telecommunication network using a plurality of federated network managers (NM), comprising the steps of connecting a first network manager ($NM_1$) to the element controller (EC) for directly managing the EC, and connecting a second network manager ($NM_2$) to the $NM_1$ for indirectly managing the EC.

The invention further comprises a method of federating a plurality of telecommunication networks for transparently increasing the number of users and the reliability of each network, comprising the steps of directly connecting a first network manager ($NM_1$) to a first group of ECs, and connecting a second network manager ($NM_2$) to a second group of ECs for direct management of the respective first and second group of ECs, providing at each ECs of the first group a collector name server with information on the $NM_1$ and any other NMs directly managing the first group, and providing at each EC of the second group a collector name server with information on the $NM_2$ and any other NM directly managing the second group, establishing a connection between the $NM_2$ and the $NM_1$, upon a connection request from the $NM_2$ to a first EC of the first group, establishing an indirect connection between the $NM_2$ and the first EC for indirect management of the first EC through the $NM_1$, and upon a connection request from $NM_1$ to a second EC of the second group, establishing an indirect connection between the $NM_1$ and the second EC for indirect management of the second EC through the $NM_2$.

The invention also pertains to a method of federating a plurality of telecommunication networks for transparently increasing the number of users and the reliability of each network, comprising the steps of directly connecting a first network manager ($NM_1$) to a first group of ECs, and connecting a second network manager ($NM_2$) to a second group of ECs for direct management of the respective first and second group of ECs, providing additional direct connections between the $NM_1$ and selected ECs of the second group, and providing additional direct connections between the $NM_2$ and selected ECs of the first group, and providing at each ECs of the first group a collector name server with information on the $NM_1$ and any other NMs directly managing the first group, and providing at the EC of the second group a collector name server with information on the $NM_2$ and any other NM directly managing the second group.

Advantageously, NMs are configured to directly or indirectly manage element controllers on a per span basis. Indirect management allows the network manager user to specify the preferred method of managing the controller, reducing the total number of direct connections to an OPC, while giving more network managers visibility of the network.

Another advantage of the architecture according to the invention is self-healing, whereby a NM seeks other NMs to federate to, or promotes itself to direct management, when a NM directly managing an element controller fails.

Scalability and survivability together mean increased numbers of users in a variety of locations, managing a larger number of network elements transparently and with higher reliability. Some element controllers are managed directly and even more, indirectly. Thus, the network architecture according to the invention allows management of up to ten thousand NEs, and up to seven hundred and fifty element controllers spans are simultaneously accessible.

Still another advantage of the invention is that by allowing each network manager to be configured individually, more flexibility over both engineering and survivability is achieved.

BRIEF DESCRIPTION OF THE DRAWINGS

The foregoing and other objects, features and advantages of the invention will be apparent from the following more particular description of the preferred embodiments, as illustrated in the appended drawings, where:

FIG. 3 illustrate survivability scenarios.

DESCRIPTION OF THE PREFERRED EMBODIMENT

Definitions of some terms used in this specification are provided next, for a better understanding of the invention.

A network manager consolidates the OAM&P information collected from the controllers in the network. An element controller, which could be an operation controller (OPC) or a managed object agent (MOA), manages a span, or sub-network of NEs, providing functions to, and collecting information from the NEs within the span.

Scalability is defined herein as the ability to configure multiple network managers in such a way that they can share information about NEs, thereby increasing the number of NEs each network manager can manage without increasing the demands on the element controllers. Network managers configured in such a manner are called federated network managers, and as a whole, they are called a federation of network managers.

Figure 1:
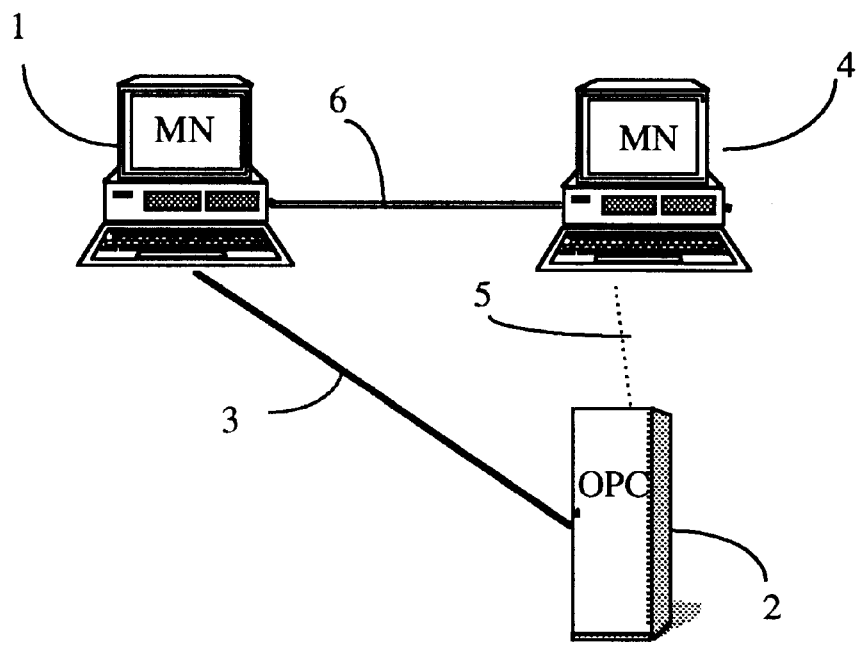
FIG. 1 illustrates a network architecture with indirect and direct management of element controllers.

Scalability introduces the concept of indirect management of element controllers via another network manager. FIG. 1 illustrates the principle of direct and indirect management according to this invention. A first network manager 1 directly manages OPCs (operation controller) 2. This is shown by direct management path (connection) 3. A second network manager 4 manages OPC 2 indirectly, as shown by indirect management path (connection) 5, via a federated connection 6 to network manager 1. The direct connections are illustrated throughout the drawings in solid lines, indirect connections are illustrated in dotted lines, and the federated connections, in double lines.

Figure 2:
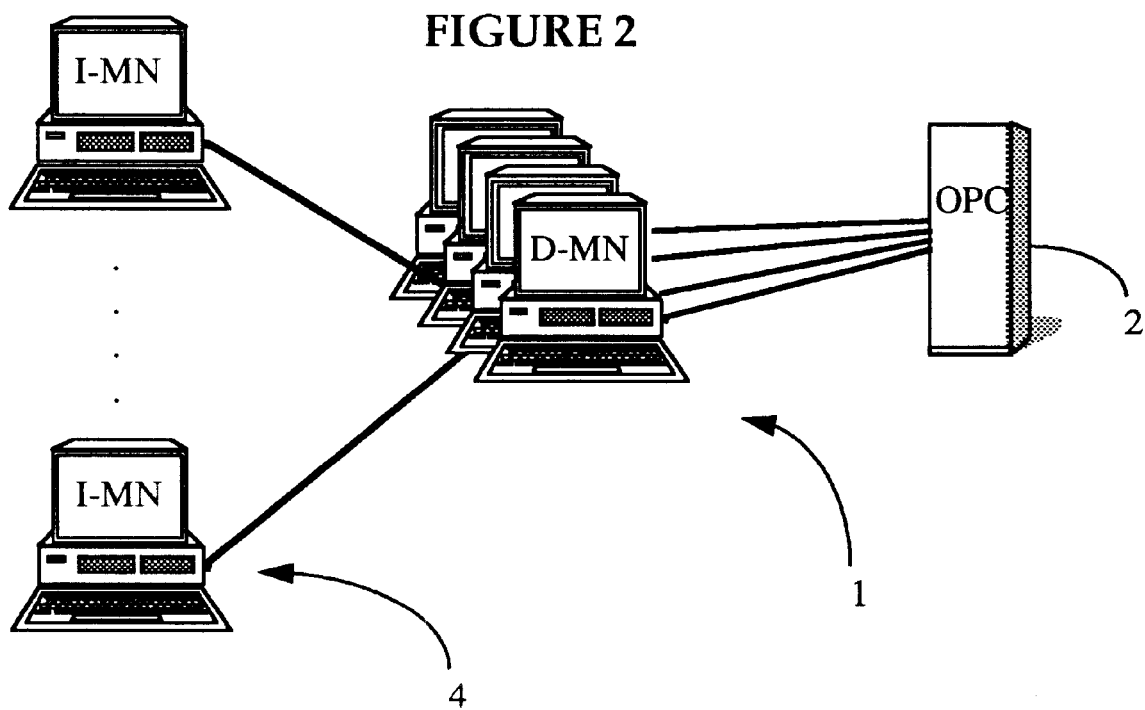
FIG. 2 shows the increase in user capacity aspect of scalability according to this invention.

The number of element controllers that can be indirectly managed is larger than the number of element controllers that can be directly managed, thereby increasing the total number of network elements the network manager can manage. Conversely, there is no restriction on the number of network managers that indirectly manage an element controller. This is shown in FIG. 2, illustrating OPC 2 managed through direct management paths by four direct NMs 1, each direct NM 1 (D-NM) being connected to 24 indirect NMs 4. In this way, each indirect NM 4 (I-NM) can indirectly manage OPC 2, resulting in a network architecture which allows management of up to ten thousand NEs, up to seven hundred and fifty element controllers spans being simultaneously accessible.

It is to be noted that a network manager acts as an indirect manager for a controller in a federation, if and only if, it is directly connected to a direct manager of that controller.

There is more to scalability than just sharing of information, scalability also provides a mechanism for increased survivability. Survivability is the ability for a federation of network managers to heal itself when there is a failure in the underlying transmission control protocol/internet protocol (TCP/IP) layer or in one or more of the network managers.

Figure 3A:
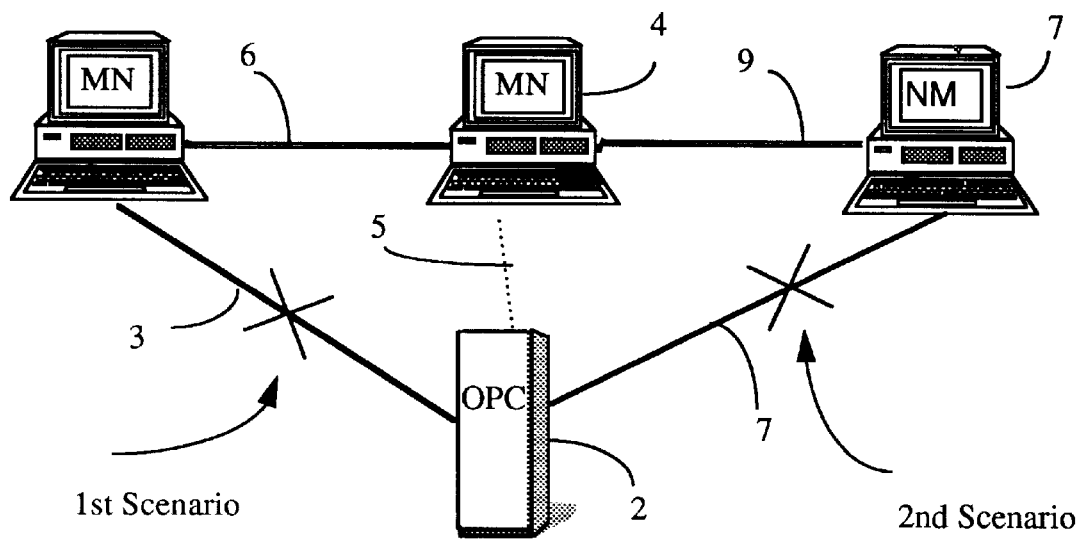
FIG. 3A shows the points of connectivity loss.

FIG. 3A shows a simple network and two points of connectivity loss, for an exemplary network comprising NMs 1 and 8 directly managing OPC 2 and a third NM 4, indirectly managing OPC 2 through NM1. A first survivability scenarios disclosed in for an interruption of the management path 3 between OPC 2 and NM 1, a second scenario is disclosed for both an interruption of the, management paths 3 and management path 7 between OPC 2 and a NM 8.

Figure 3B:
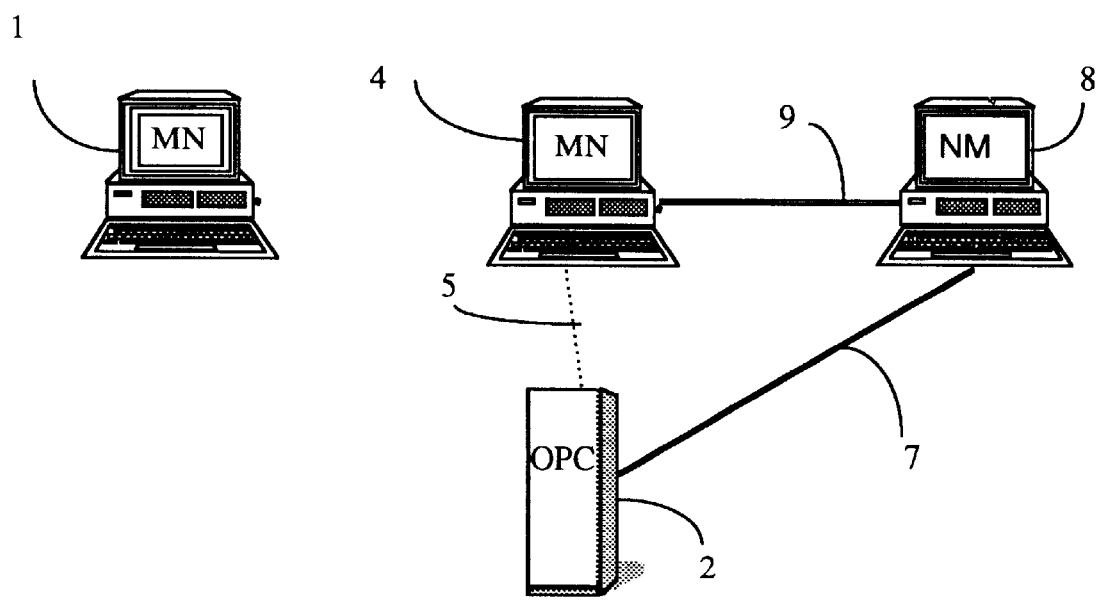
FIG. 3B shows how management of an element controller is effected by an alternative network manager (NM) in case of connectivity loss.
Figure 3C:
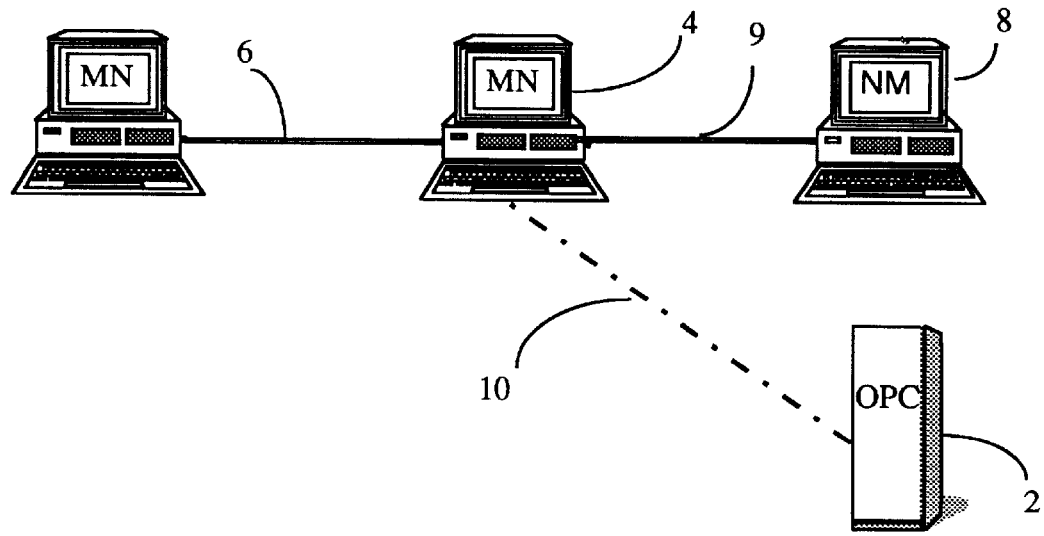
FIG. 3C illustrates a reluctantly promoted management path.

In the case of the 1st scenario, (NM) 4 cannot manage any more OPC 2 indirectly through NM 1, and it looks for an alternative management path. As NM 4 is federated with NM 8 over federated connection 9, NM 4 detects this alternative NM 8 and re-establishes an indirect management path to OPC 2 through NM 8, as shown in FIG. 3B, As indicated above, NM 4 has a preferred indirect connection to OPC 2. However, if both management paths 3 and 7 are interrupted, (second scenario), NM 4 cannot indirectly manage OPC 2. Now, NM 4 is forced to establish a direct connection because of the lack of an indirect connection. This connection is termed a direct reluctantly promoted connection. This connection/state is considered transitory, and NM 4 will attempt to restore back to indirect management at the first available opportunity. This scenario is illustrated in FIG. 3C, where NM 4 promoted itself to directly manage OPC 2 through a reluctantly promoted management path 10.

FIGS. 4A to 7 show examples on how a network evolves as the number of the subscribers grows and as the user's requirements change. These scenarios also depict one way the phased delivery of scalability functionality could impact the evolution of network management in a company.

Figure 6A:
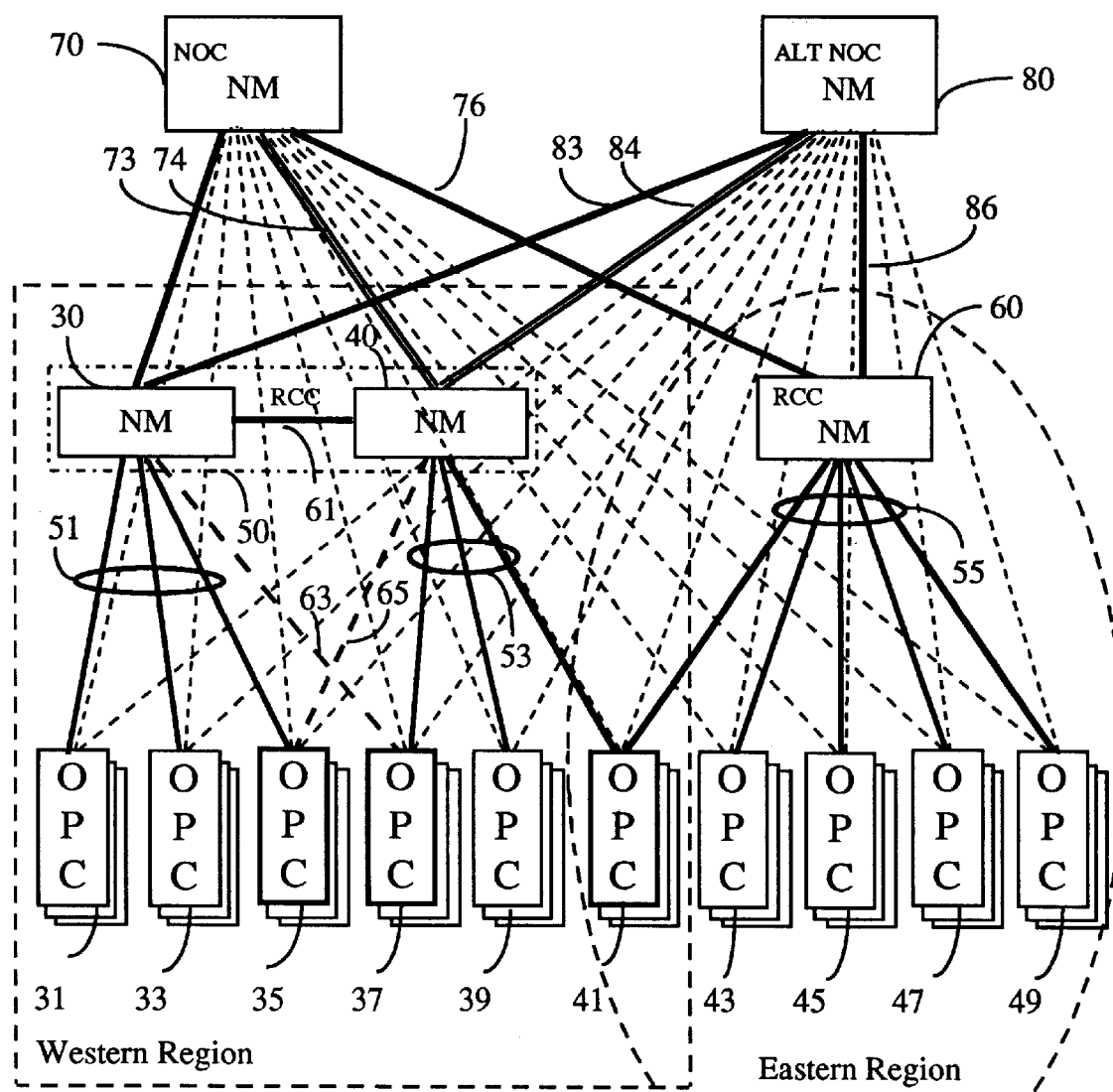
FIG. 6A shows the evolution of network of FIG. 5B, with network operation centers, federated, direct and indirect connections.

Let's assume that the size of the initial network has recently grown such that a network provider (NP) can no longer manage the entire network from a single network manager. When this point was reached, the responsibility for the network is divided between two regions, Eastern and Western regions, as shown in FIG. 6A.

As well, let's assume that the Western region is expected to grow more in the near future, so the provider planned ahead and deployed two network managers 30 an 40 at the Western region control center (RCC) 50.

Each network manager directly manages a number of operation controllers 31, 33, 35, 37, 39, 41, 43, 45, 47, and 49. The description and drawings refer to OPCs for simplification, but it is to be understood that the invention applies also to other element controllers. The OPCs are deployed as necessary at various sites in the Western and Eastern region. FIG. 6A also shows that some OPCs are managed by two network managers, for reasons that will be explained later. Thus, OPCs 35 and 37 are monitored by both network manager 30 and network manager 40, OPCs 41 are monitored by network manager 40 in the Western region and network manager 60 in the Eastern region.

Figure 4A:
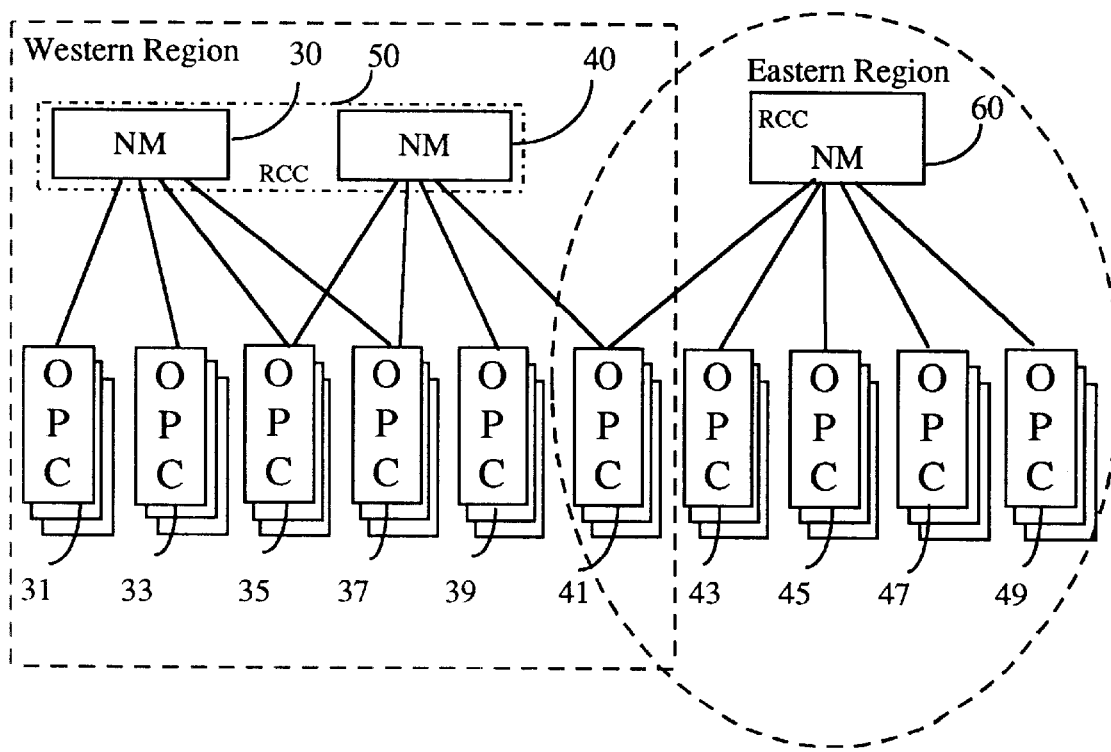
FIG. 4A shows an exemplary network extending over two regions.
Figure 4B:
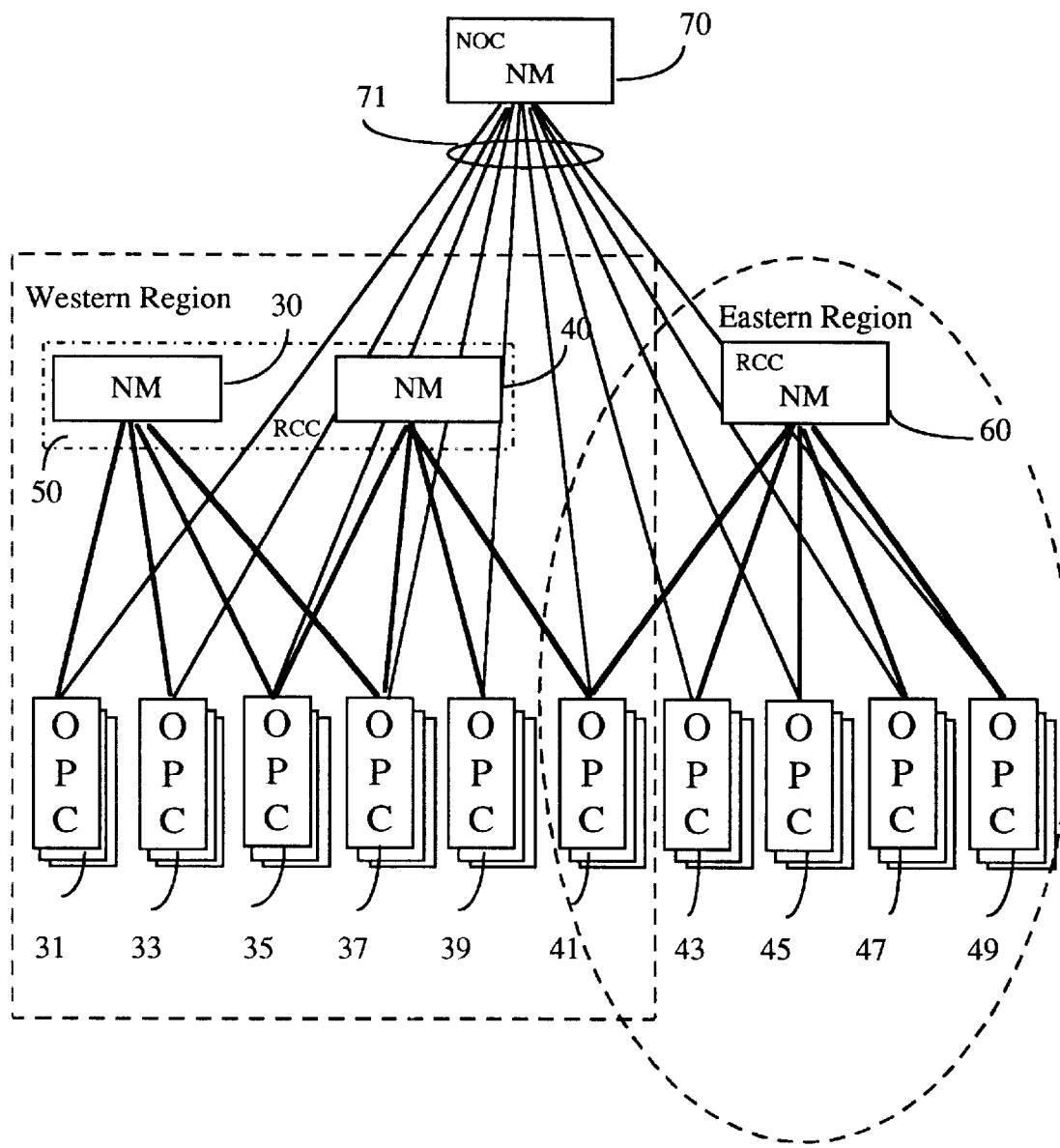
FIG. 4B shows a first phase in the network growth comprising a network operation centre.

The explosive growth of the network of FIG. 4A has led NP to realize that a network operations center (NOC) 70 need to be created for monitoring the entire network via direct connections 71, as shown in FIG. 4B for the second phase of growth (NOC is also a NM). The regional network managers 30, 40 and 60 still exist for the day-to-day running of the network, while the NOC 70 is primarily used for off-hours support and demos to customers.

As each controller can be directly managed by maximum two network managers in the phase shown in FIG. 4A, NP realizes that the number of connections per OPC must be increased from two to four for allowing more connections per OPC and more OPCs per network manager, for some controllers, such as OPC 35, 37 and 41 which each need three connections to them.

However, the solution of FIG. 4B is temporary, for as soon as the number of OPCs in the network outstrips the maximum number that can be monitored from the network manager in the NOC, NOC 70 can no longer monitor the entire network. Increasing the number of element controller connections does nothing to enhance survivability, except increase the number of workstations that can monitor the network.

Figure 4C:
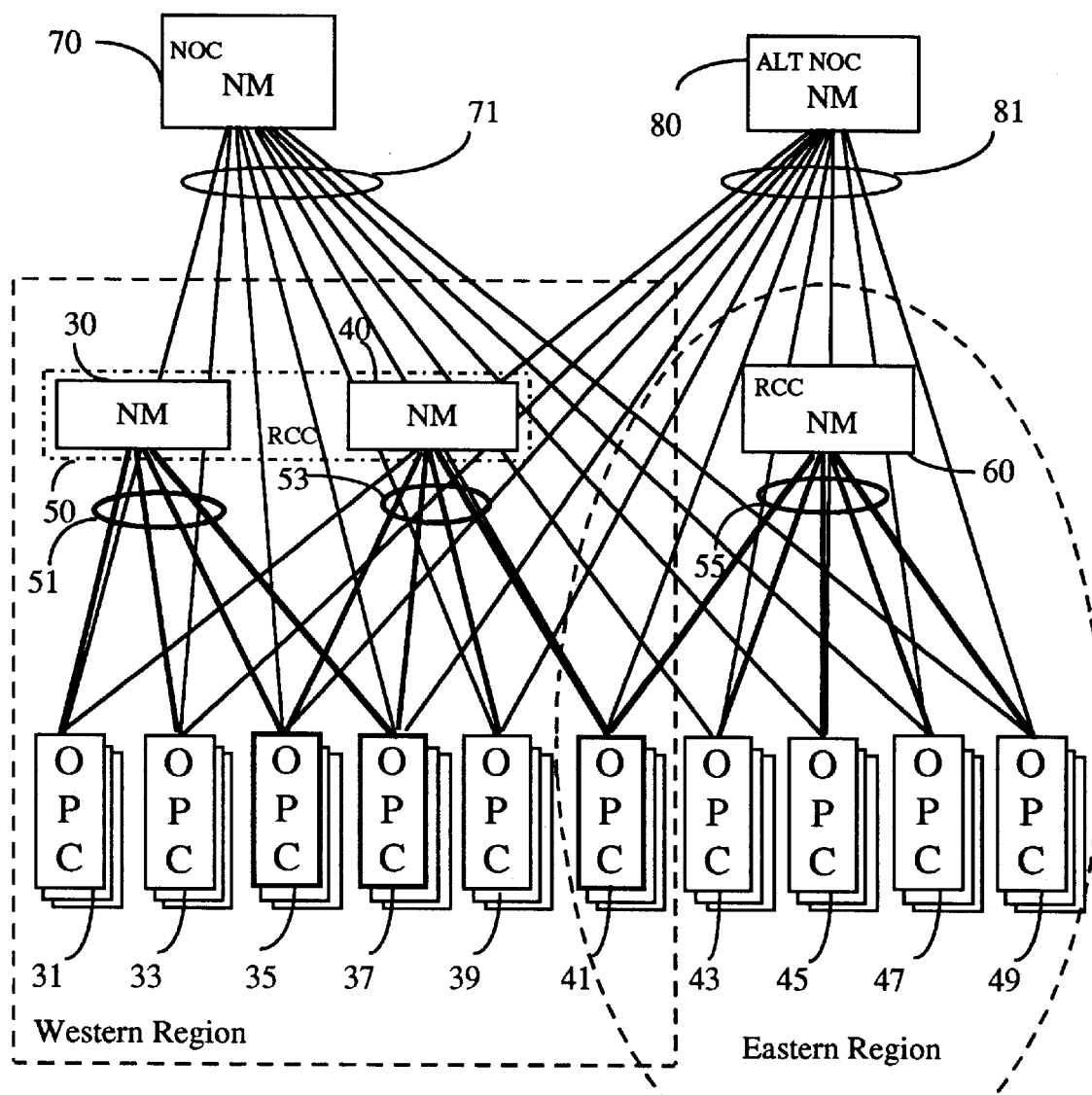
FIG. 4C shows a second phase with an alternative network operation centre for survivability.

In addition, the site for NOC 70 can be a dangerous place, subject to earthquakes, volcanoes, power outages and crime. NP is concerned about survivability of the network and has built an alternative NOC 80 at a different site, to take over in disaster scenarios, as shown in FIG. 4C. Additionally, the alternative NOC 80 can be used to off-load NOC 70 during peak demand and holidays. Unfortunately, by providing alternative NOC 80, provision of direct connections 81 to the OPCs exhausts the current maximum number of connections (four) for OPCs 35, 37, and 41.

Also, it is not possible to increase the number of the OPCs in the network of FIG. 4B, since additional OPCs cannot be managed by NOC 70, the current engineering limit being 150 OPCs for a NOC, or 75 OPC pairs. As well, if for some reason, more network managers were required to monitor controllers 35, 37, and 41, this would be possible only using indirect management.

Figure 5A:
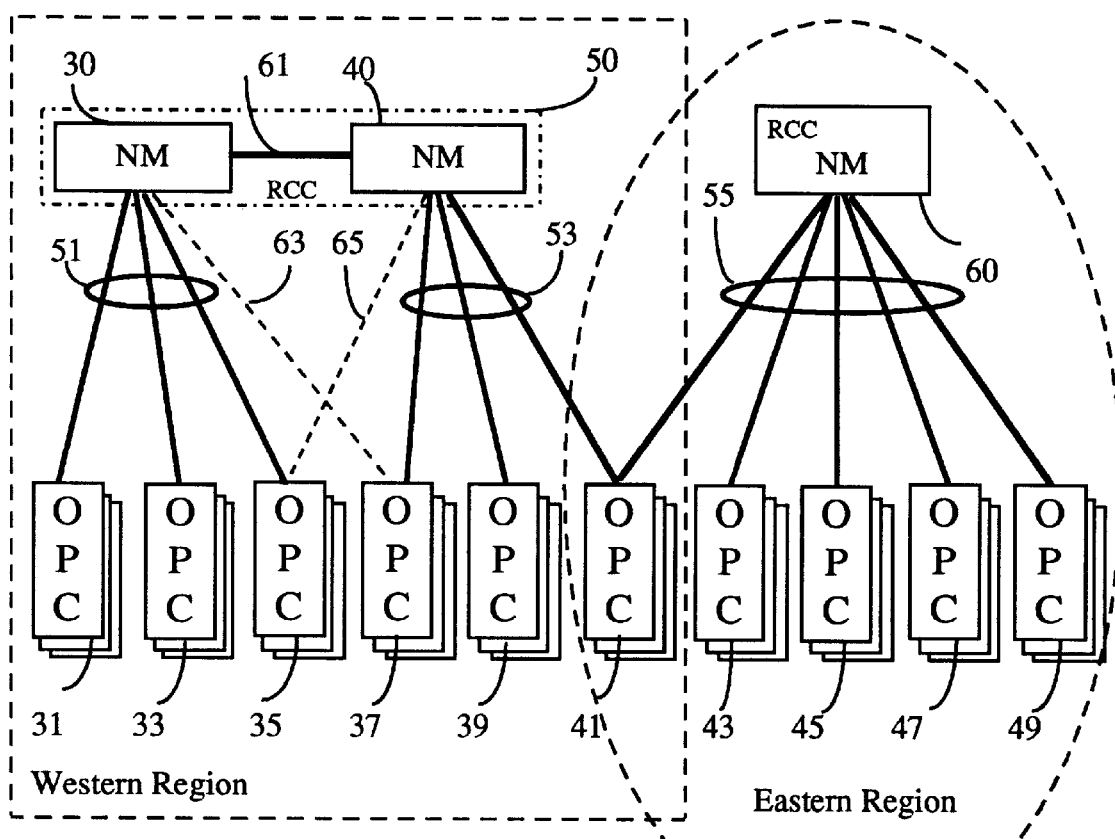
FIG. 5A illustrates an example of evolution of the network architecture of FIG. 4A, using indirect and direct management.

Not taking the NOCs into consideration just yet, indirect element controller management allows a reduction in the number of connections used at the sub-network controlling devices, as seen in FIG. 5A. The number of direct connections in group 51 and group 53 has been reduced from four to three by implementation of indirect connections 63 and 65. For implementing the indirect connections, a federated connection 61 has been set between NM 30 and 40. No changes have been made to the OPCs that each network manager directly manages, NM 30, 40 and 60 see the same controllers as before indirect management.

Figure 5B:
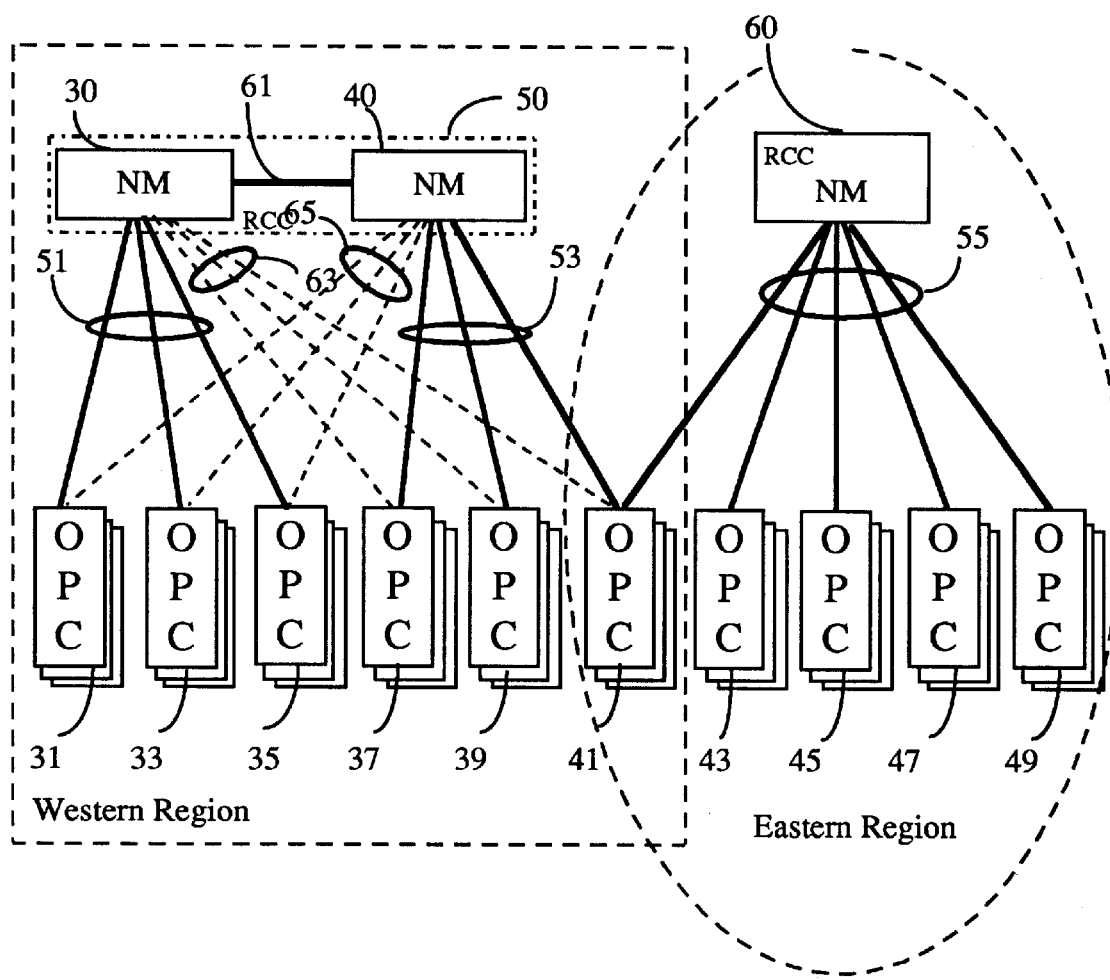
FIG. 5B illustrates a further evolutionary stage of the network of FIG. 5A using a federated connection between regional network managers, together with indirect and direct management.

Next phase of growth provides for expanding the controllers managed by network manager 30 to include OPCs 37, 39 and 41, namely all OPCs in the Western region, as shown in FIG. 5B. This was done by increasing the number of indirect connections in group 63 from one to three. Similarly, the OPCs managed by NM 40 include now all of the OPCs in the Western region, by increasing the number of indirect connections in group 65 from one to three. By indirectly connecting to OPCs 31, 33 and 35, more users have visibility of all of the NEs in the Western region.

In the next phase of network growth, NOCs 70 and 80 are given a view of the entire network by federating each network operating center with the regional network managers 30, 40 and 60, as shown in FIG. 6A. This implies providing federated connections 73, 74 and 76 for connecting NOC 70 with regional network managers 30, 40, and 60, and federated connections 83, 84 and 86 respectively, for connecting NOC 80 with regional network managers 30, 40, and 60. Indirect connection 63 and 65 are configured as in the embodiment of FIG. 5A. NOCs 70 and 80 do not directly manage any controllers, rather they manage all of the OPCs indirectly via the regional network managers. Implementing this is easy as it is simply a case of changing the existing direct connections to the OPCs, as shown in FIG. 4C, into indirect connections.

Figure 6B:
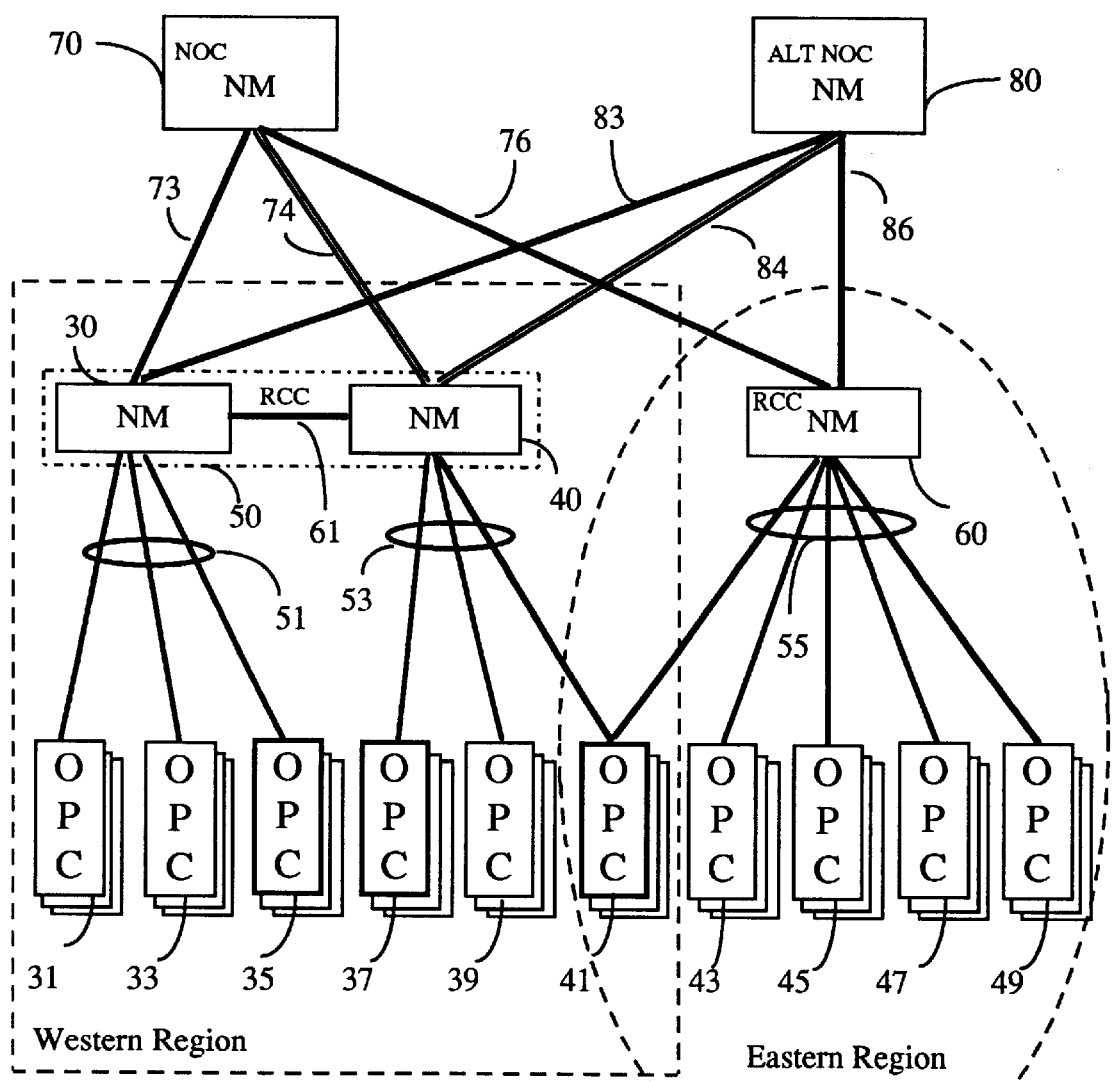
FIG. 6B shows the architecture of FIG. 6A, indirect connections removed.

A much cleaner picture of the connections in the network is shown in FIG. 6B, which is FIG. 6A with the indirect connections removed. In reality, the indirect connections are only logical connections, no surveillance or status information flows along these connections.

Unfortunately, it is not clear from FIG. 6B the OPCs that each network manager indirectly manages. This is not important from a users' point of view, but from an engineering point of view, this picture clearly depicts the "nailed up" connections between the OPCs and the network managers, and the federated connections between the network managers.

Figure 7:
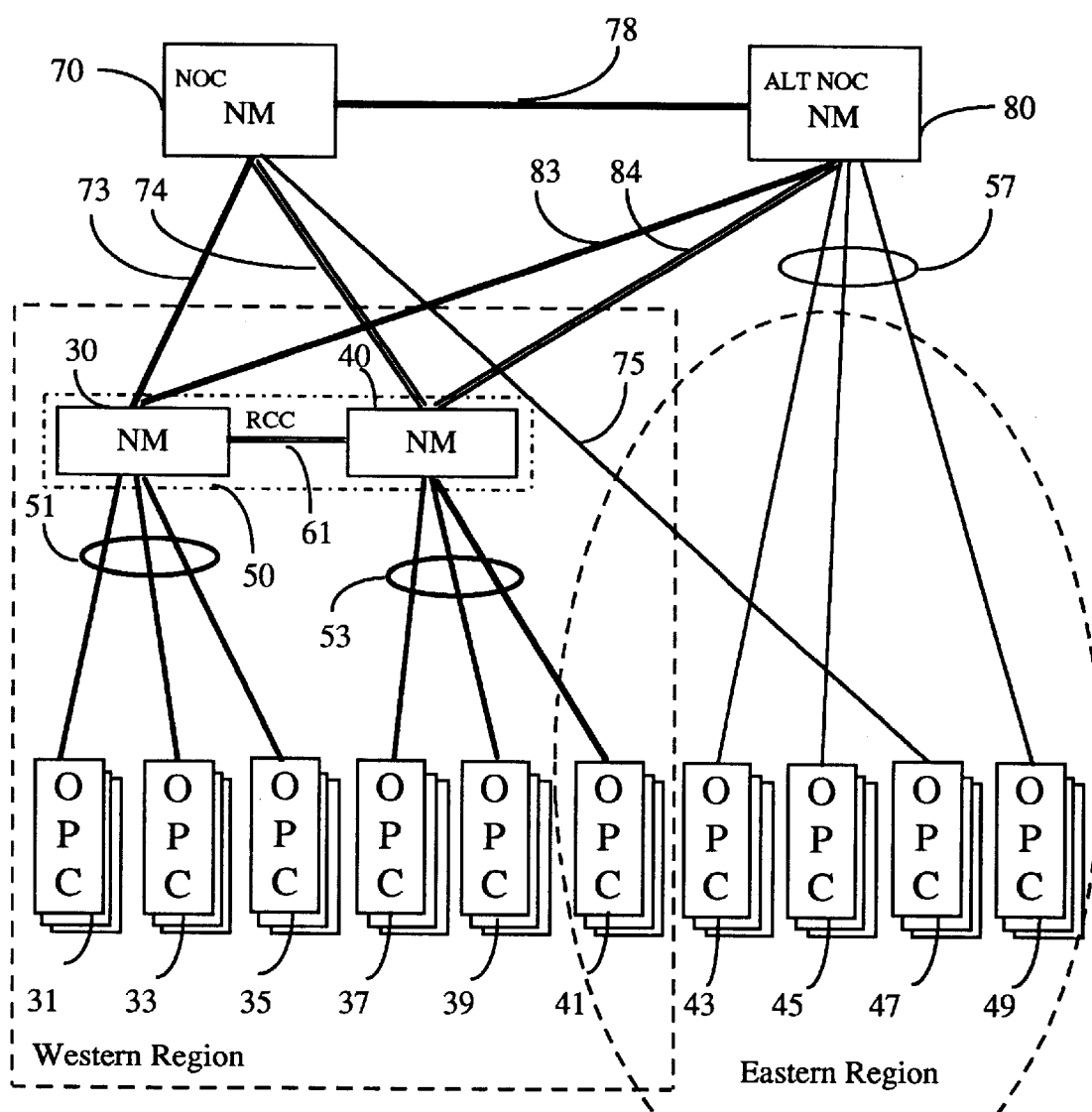
FIG. 7 shows one possible reconfiguration of the network of FIG. 6A in case of failure of a regional network manager.

Regarding how survivable this configuration actually is, let's assume that, for example, NM 60 is accidentally turned off. Now, NOCs 70 and 80 cannot indirectly manage the OPCs 41, 43, 45, 47, and 49 in the Eastern Region, and some form of direct management must be provided. One possible reconfiguration is shown in FIG. 7, NM 60 with its direct connections is not shown for simplification and also because is not turned on. Controllers at 47 are now directly managed by NOC 70, and controllers at 43, 45 and 49 are directly managed by NOC 80. NOCs 70 and 80 have created a federated connection 78 between them so that they can indirectly manage the OPCs the other is directly managing.

In general, the sharing of the load of managing the OPCs must not necessarily be divided equally between the network managers. In the first phase of scalability, indirect connections should be attempted first to the network manager whose address is defined in a preference file, or lacking that, if sub-networks are implemented, to a workstation on the same sub-network as the indirect client. Either way, the number of simultaneous users of the NOC at each site has grown to exceed the maximum supported by a single workstation. However, using scalability, it is a simple case to add another workstation in the site of, for example NOC 70, to allow more users, as shown in FIG. 8.

Figure 8:
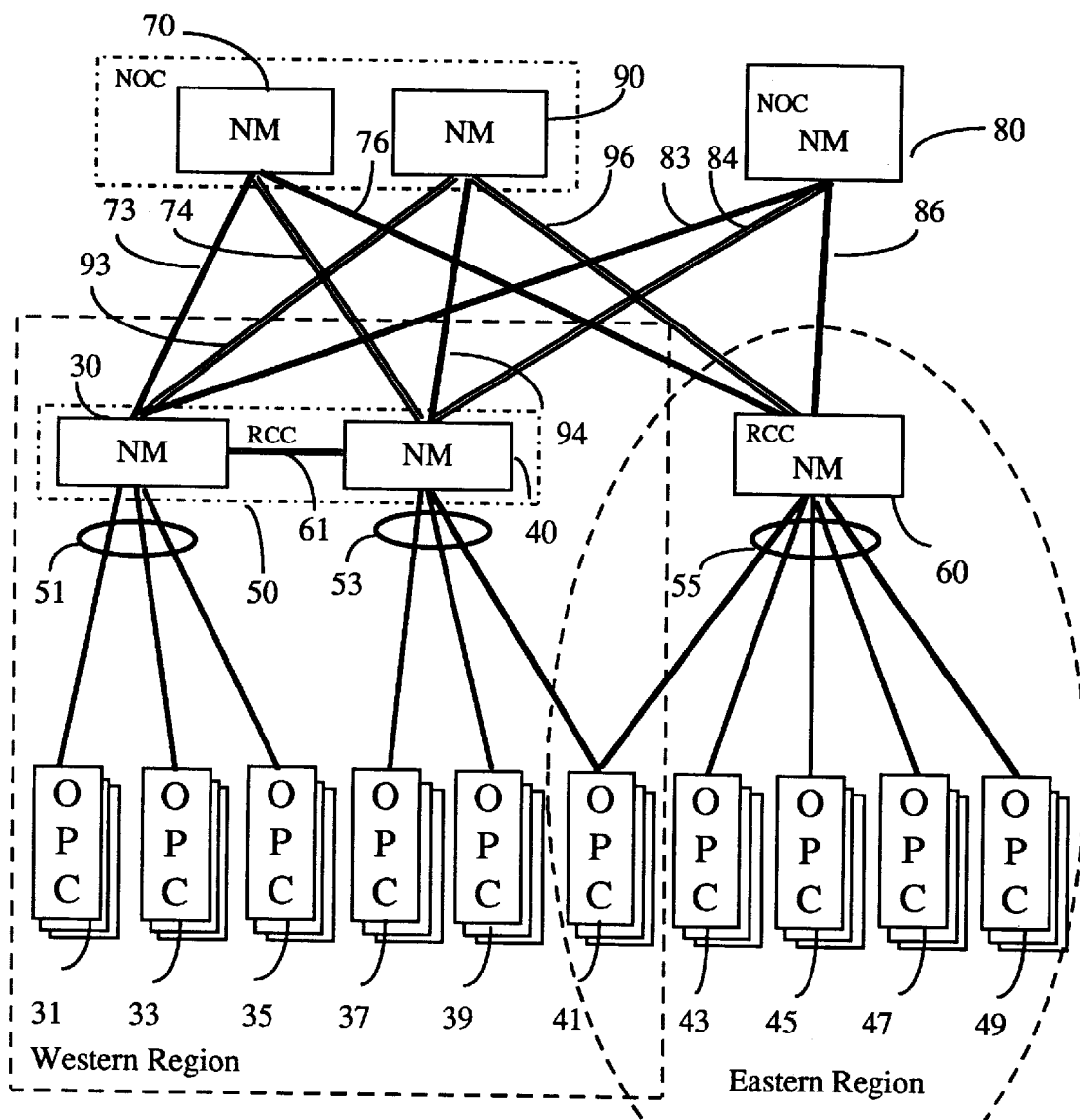
FIG. 8 shows how the number of users of configuration shown in FIG. 6B may be increased using scalability.

All of the OPCs of FIG. 8, but OPC 41, now only have one connection to them, even though most of them have four network managers managing them. The addition of a third NOC 90, would not change these numbers. Additional connections to OPCs are now no longer required to get visibility from different network managers, rather the additional connections are used to engineer better survivability configurations or to restrict access for whatever reasons.

Self-healing requires a NM to seek out other NMs to federate to, or in the worst case, a network manager has to resort to directly managing the controller. Finding another network manager to federate to is the ideal self-healing process, because the healing process is quite short, and therefore configuring the network to try and take advantage of this is highly desirable. One way to facilitate this objective is to have multiple network managers directly managing each OPC, so that federated network managers can quickly re-establish indirect connections. Eliminating single-points of failure is the primary goal. Ideally, the network managers directly managing each OPC should be connected via different routes and should be geographically separated to eliminate the chance of environmental problems disabling both network managers simultaneously.

Figure 9:
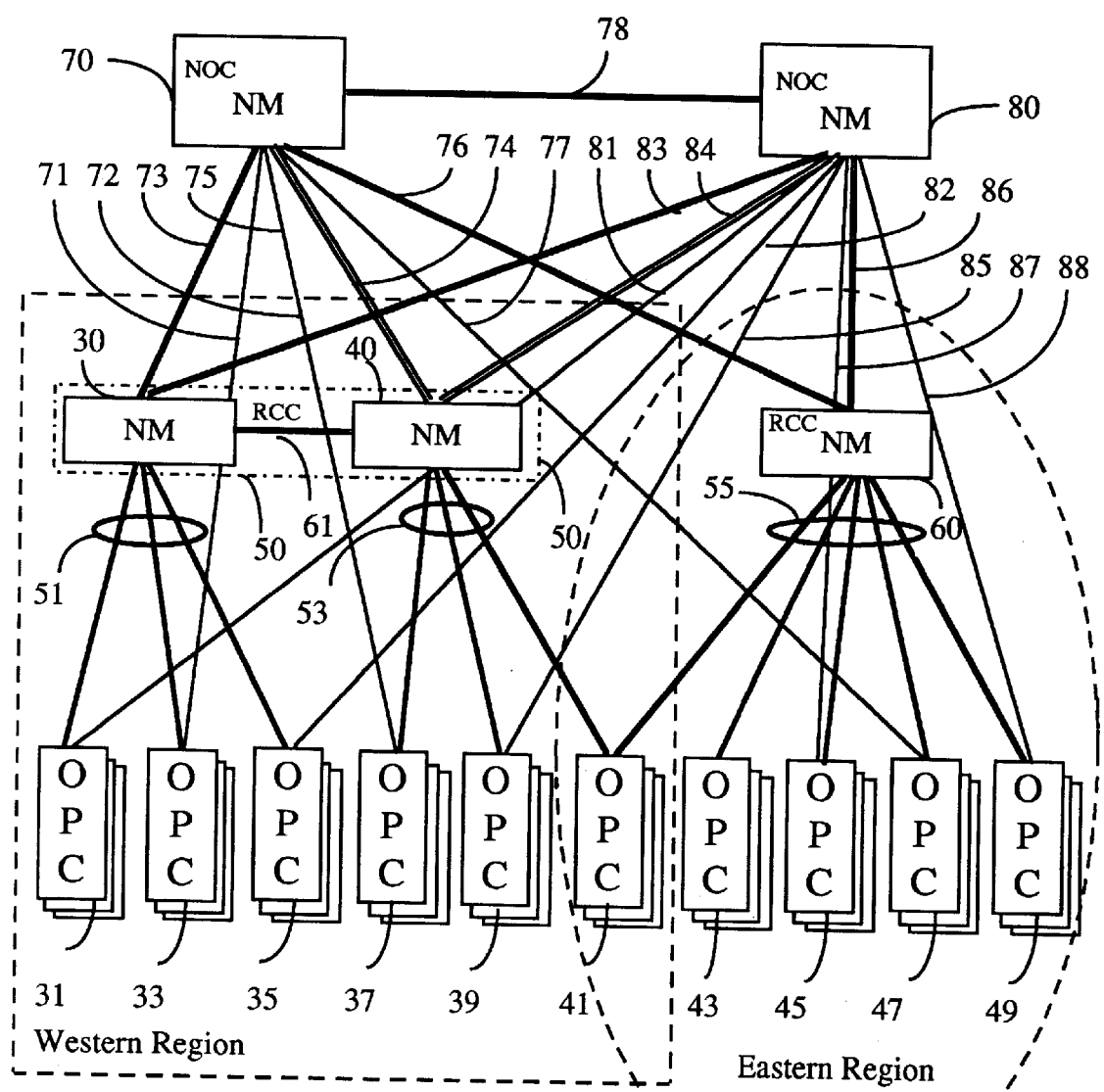
FIG. 9 illustrates a further evolutionary stage for the network of FIG. 6, designed for increased survivability.

The configuration of FIG. 8 is still asymmetric in that the regional network managers still do not manage OPCs outside of their region. The resulting configuration is shown in FIG. 9. On the other hand, while adding multiple direct connections in one federation potentially increases the recovery time in the case of a failure (it is assumed that initializing through a federated workstation will be quicker than connections to an OPC directly), the total number of controllers that can be managed across the federation will be decreased, as the engineering limits will strictly enforce the total number of direct connections per network manager.

Taking all this into account NP decided to increase the responsibility of the NOC workstations so that they share in the management of the controllers, as shown in FIG. 9.

There are now multiple routes for a network manager to indirectly manage an OPC. For example, network manager 70 could monitor OPCs 49 via federated connection 76 to network manager 60, and the respective direct connection of group 55, or via federated connection 78 to network manager 80, and direct connection 88. Both routes directly manage OPCs 49.

The responsibility of each regional network manager is wisely split in the configuration of FIG. 9, so that the effort is shared when a regional network manager is off-line. Thus, if network manager 70 were indirectly managing OPC 49 via network manager 60 and network manager 60 lost power, network manager 70 would switch to indirect management via network manager 80. If network manager 80 were indirectly managing OPC 41 via network manager 60, and network manager 60 lost power, network manager 80 would switch to indirect management via network manager 40. If network manager 70 were indirectly managing OPC 45 via network manager 80, the failure of network manager 60 would have no impact.

If subsequently network manager 40 failed, there would no longer be any network managers directly managing the OPCs 41 and one of network managers 30, 70, or 80 would have to directly manage OPCs at 41. For example, network manager 30 could reluctantly promote itself to manage OPCs at 41, network managers 70 and 80 would then indirectly manage this OPC via network manager 30. Similar recognition would occur for the other OPCs at 41 and the load of directly managing these orphaned controllers would be shared amongst the remaining network managers.

If NP wishes to enter a joint alliance with a long-distance provider LD, they must share management of a set of OPCs, let's say OPCs 41. Most probably, NP does not want LD to determine how the remaining of the network is managed. Conversely, LD does not want NP to determine how its network is managed. The solution is to configure separate networks to terminate at the OPC, and each company to configure their network manager to directly manage the shared OPCs. This does not change the NP configuration of the network of FIG. 9 at all, except the number of free connections on each of the shared OPCs is reduced.

In the case of the multiple failure scenario above and shared OPCs at 41, when network manager 40 failed, network manager 30 would attempt to connect to the LD NOC 80. However, because the LD network manager is on another network, there is no IP connectivity to this network manager and network manager 30 is forced to resort to direct management of OPC 41, even though there is another network manager, namely NM 60, directly managing the OPC 41. Thus, configuring the IP network is important to prevent network manager 30 indirectly managing OPCs at 41 via the LD network manager.

Figure 10:
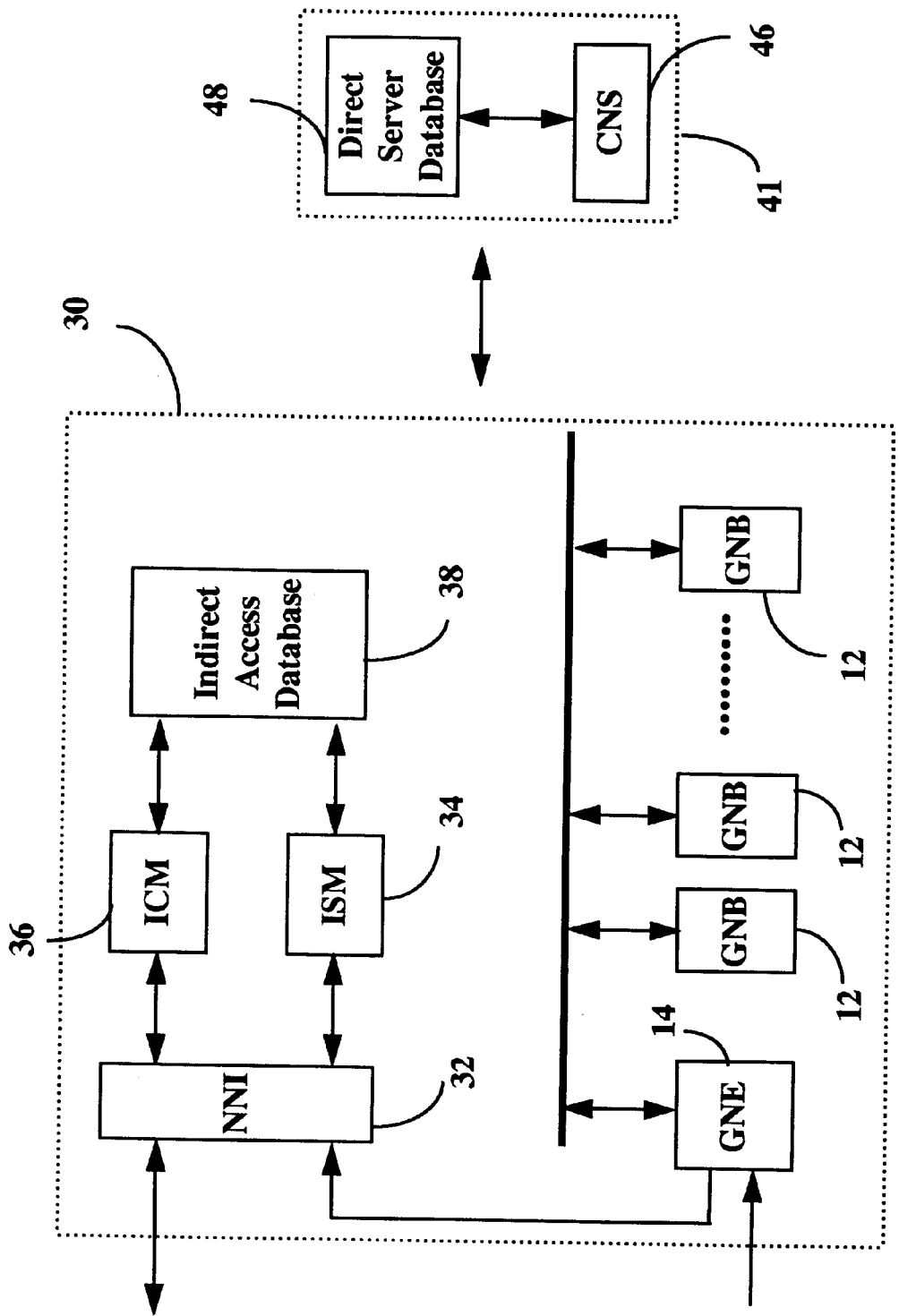
FIG. 10 shows the main components of the network manager and the element controller for implementing the architecture of the invention.

FIG. 10 shows the main components of a NM and an element controller relevant to this invention. Network manager 30 shown in FIG. 10 is a workstation which provides nodal and sub-network OAM&P capabilities through a single view of transport and access nodes and directly manages a plurality of NEs that are connected to OPC 41. As indicated above, NM 30 may also indirectly manage a plurality of OPCs and can act as a client or server for other NMs.

NM 30 provides a graphical surveillance user interface (GUI) tool including a plurality of graphical network browsers (GNB) 12 and a configuration GUI named the graphical network editor (GNE) 14. According to the invention, whether an element controller is directly or indirectly managed has no bearing on the performance or behaviour of the GNB 12 and is transparent to the GNB user.

Network managers are configured by the user via GNE 14 to directly or indirectly manage element controllers on a per span basis. Provisioning what controllers the network manager is interested in by specifying their IP address, is done in the GNE 14 as usual. The fundamental difference is that the operator may now select the preferred management path, direct or indirect. To this end, GNE 14 selects the element controller and the preferred management path, i.e. direct or indirect. An indirect server manager component (ISM) 34 and an indirect client manager component (ICM) 36 are the core of the scalability and survivability solution. These components are integrated into the existing network manager collector process and provide the ability to service incoming requests from other network managers as an indirect server, and to similarly establish connections to other network managers as indirect clients.

ISM component 34 provides a mechanism to service indirect management requests from other network manager workstations. This is accomplished by creating a TCP/IP server at a well known port for processing the incoming requests.

The information flow between NM 30 as a directly managing server and a client NM is provided over a federation network interface (NNI) 32. Once the interface is negotiated, the indirect server 34 waits for requests from the client NM for the specific OPC/MOA entities that the requester is interested in. Only requests for controllers that are currently being managed via a direct connection to the OPC or MOA such as OPC 41 will be considered by ISM 34.

When this negotiation is complete, information flow for the controller pair is transmitted from ISM 34 to the indirect client NM. Only one TCP/IP connection is maintained per communicating network managers. This information includes core network element information, such as name identifiers, rate, type and support information, existing active alarms, and asynchronously delivery alarm state transitions, performance monitoring support information, sub-network configuration data, and network element connectivity or association status.

The role of ICM 36 is to find a path to a controller if the management path is specified by GNE 14 as indirect. It does this by first querying that OPC for the list of currently connected network managers, then attempting to register indirectly through another network manager. If there are no direct managers available, ICM 36 will attempt to reluctantly promote itself to direct management of that controller.

When presented with a choice of two or more possible routes for indirect management, ICM 36 will choose a preferred route according to a preference algorithm, if it is available. The preference algorithm uses an indirect access database (IAD) 38, and performs for example the following operations:

First, IAD 38 is consulted by ICM 36 for the list of preferred paths. If there is a match, that path is attempted first. For example, an entry in IAD 38 of form '47.105' means that presented two possible indirect paths '47.105.9.219" and '47.45.4.48', '47.105.9.219' will be selected first.

Next, if sub-networks are implemented, and if one of the routes is a network manager on the same sub-network as the client, that route is attempted first.

Last, a random selection is made if no preferred path resulted from the above operations.

This strategy allows for an additional level of control over indirect management, allowing optimal network paths (where there is more bandwidth, for example) to be established first, if available.

IAD 38 is also consulted by ICM 36 before allowing access to an indirect manager client. This database comprises of a list of IP addresses or sub-networks that requests will or will not be accepted from. This is used to facilitate the creation of independent federations which do not share management information or interact with each other. It is also used to ensure a predictable environment during software testing. The database 38 is modifiable using a simple configuration tool accessible from the existing administration tools.

The effect of increasing the total number of NEs impacts on the total amount of network configuration data that must be stored, including active alarms for the entire network. This requirement places additional burden on the NM physical resources. The underlying assumption in evaluating the impact on NM, however, is that only a relatively small portion of that data will ever need to be duplicated through user interfaces at any one given instance in time.

A network data cache (NDC) may be used in another embodiment of the invention for managing and storing data previously shared by all GNB's into a single cache entity, available for reading by all network manager processes. NDC is used to write various data in a shared area to be accessed in a read-only fashion by all other network manager processes. The goal of NDC is to achieve an order of magnitude savings as compared to the existing GNB 12 and GNE 14 process under similar loaded conditions, thus minimizing or eliminating the requirement for additional hardware to achieve the engineering limits.

A component of the architecture according to the invention is implemented in the collector name server (CNS) 46 component provided at each OPC/MOA workstation. CNS 46, whose interface is implemented through the existing regulation browser (REGB) process on the OPC, provides a mechanism to query the OPC server for the existing directly connected NM workstations, necessary for enabling ICM 36 to select a path for indirect management.

In the a preferred embodiment, access to the NE and OPC/MOA user interface is accomplished by using the primary network manager collector to controller interface to add entries in the appropriate control files on the controller, which then allows the network manager unauthenticated remote execution of selected processes, if a concurrent entry for the invoking client UNIX userid is present on the controller.

As a design requirement, each indirect connection accounts for the equivalent of two directly managed element controller spans. This parameter is enforced and has been deduced by engineering studies on the existing architecture. An interface is provided by ISM 36, to manage and keep track of these indirect connections for the purpose of engineering the entire NM collector process. Specifically, because of the possibility of a failure of one or more indirectly managing workstations causing the client to attempt direct connections to the controller and potentially well exceed its maximum number of direct connections, this number in conjunction with the current number of primary and backup direct connections may be used to enforce engineering limits in the software.

Additional changes can be made to the existing components of the NM. For example messaging optimizations between GNB 12 and the components of the NM must be provided as a result of these changes. The controller list dialogue can also be substantially modified to accommodate the now larger volume of controllers, as well as reflect the routing decisions being made by the network manager, such as IP address of network manager serving an indirect connection, indirect or direct preferred state, and the current actual management state of each controller. This information should also be visible to GNB users in a read only fashion.

It is suggested that T1 or equivalent bandwidth as a minimal requirement to sustain acceptable performance between federated network managers. Given the basic data provided, the entire network bandwidth can be engineered to account for shifts in management responsibility that will happen when survivability aspects are considered. Any extra bandwidth required to maintain acceptable performance when shifts in management happen will largely depend on how the federation is setup and how many spans are being managed concurrently across the federated connections.

Figure 11:
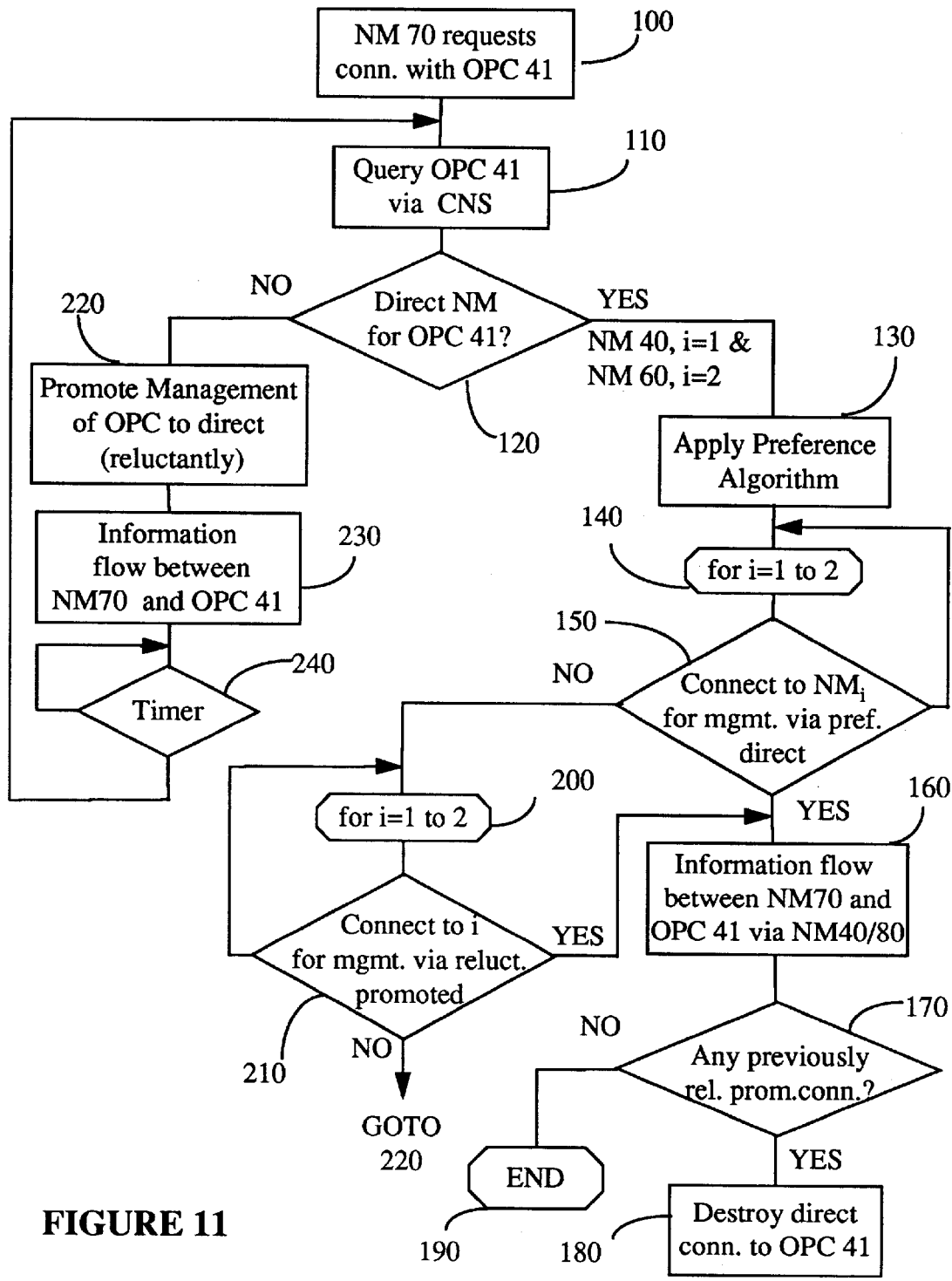
FIG. 11 is a flow-chart for operation of the network to establish an indirect connection between a NM and an element controller.

FIG. 11 illustrates how an indirect connection is established in the network of FIG. 9. Let's suppose that NM 70 requests communication with OPC 41 as shown in step 100. NM 70 queries OPC 41 via CNS 46 regarding the NM directly connected to this OPC, in step 110. If a plurality of direct NMs is found, such as NM 40 and NM 60 in step 120, a preference algorithm selects a preferred direct NM in steps 130–150.

When specifying a preferred direct connection, an attempt is made to register directly with the element controller 41 as usual. If both NM 40 and NM 60 failed, or none of NM 40 and NM 60 directly manage OPC 41, as illustrated along the NO branch in step 120, NM 70 would negotiate a self-promotion with the element controller to directly manage it, as shown in step 220. Information now flows between NM 70 and OPC 41, step 230, and other network managers could then indirectly manage the element controller 41 via this promoted network manager.

If the connection was established through a reluctantly promoted network manager, NM 70 will attempt to restore back to indirect management at the first available opportunity, as shown by the timer in step 240.

As indicated earlier, if NM 40 and NM 60 are operational to directly manage OPC 41, NM 70 must select one of these two NMs (i=1 or i=2) for indirectly managing OPC 41. The preference algorithm initiated in step 130 is designed to take into account the network architecture and also the client's demands. In steps 140 and 150 NM 70 determines which one of NM 60 and NM 40 has a preferred direct connection to OPC 41 and establishes a management path to this preferred NM. If a preferred direct connection is not available, as shown by branch 'NO' of block 150, NM 70 determines which one of NM 60 and 40 has a preferred reluctantly promoted connection to OPC 41, as shown in steps 200 and 210. Step 160 shows the flow of information between NM 70 and OPC 41, once a management path has been established in steps 130, 140, 150, 200, and 210.

Any changes in management path initiated under the control of the federation will attempt to happen transparent to the GNB user, in other words without indicating a loss of connectivity for those network elements affected (normally done by turning the affected icons blue). This is called a no-blue switch.

A direct benefit of scalability is the inherent survivability that comes from the distributed management of the network. Survivability is implemented using a revertive N:1 strategy that allows multiple network managers in the federation to maintain management of element controllers which can no longer be managed by another network manager for reasons such as workstation or network outages. This is accomplished by an indirect client, such as NM 70 in the example of FIG. 9, seeking out another server, such as NM 60 in the federation, if its current server becomes unavailable, or if a controller becomes unavailable from the point of view of the current directly managing server. The NEs operate as in the case of establishing an indirect connection, shown in FIG. 11.

If a network manager workstation cannot directly manage an element controller, it can no longer facilitate indirect management of the controller for federated network managers. Federated network managers that used to indirectly manage that controller will now have to find alternate means of doing the management, directly or indirectly. As part of the self healing process, the affected network managers will first try to find another network manager directly managing the NE controller and establish a federated connection to it for the purpose of indirectly managing that NE controller. In the above example, NM 40 will be selected by the preference algorithm in step 130.

Figure 12:
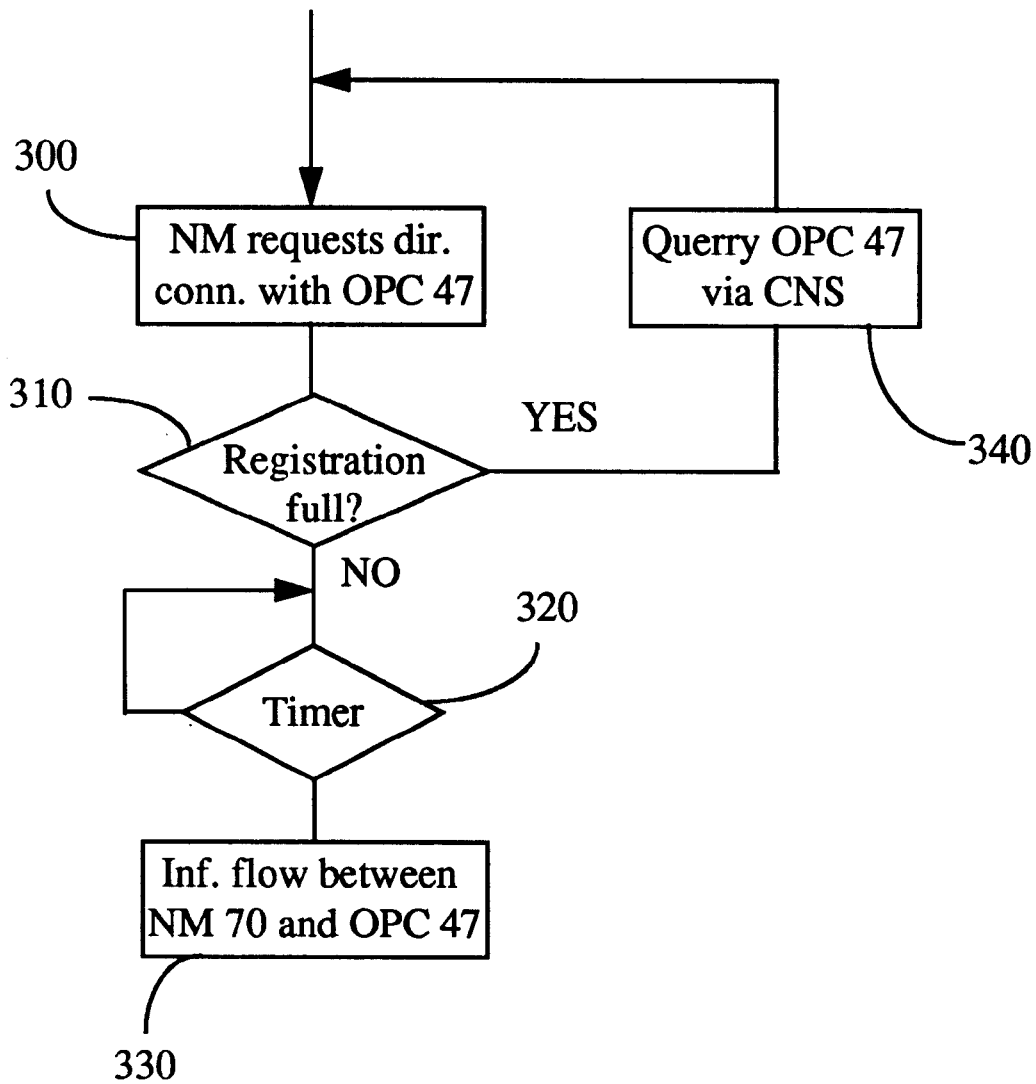
FIG. 12 is flow-chart showing the operation of the network to re-establish a direct connection between a NM and an element controller.

FIG. 12 is flow-chart showing the operation of the network to re-establish a direct connection. In step 300 NM 70 requests a direct connection with OPC 47. If the registration to this OPC is full, i.e. the element controller already serves four NMs, as shown by the 'YES' branch in step 310, the query is repeated at regular intervals of time, shown in step 320, until OPC 47 becomes available, shown by branch 'NO'. In this case, information flows between NM 70 and OPC 47 along direct connection 77, as illustrated in step 330.

Any changes in management path that are initiated by a real loss of connectivity, such as an outage of the supporting indirect server workstation, or the lack of network connectivity to an OPC or MOA workstation, will always be indicated to the user.

If a network manager preferred management route is direct, and it cannot establish a direct connection because the controller registration is full and all other connections are preferred direct, it will not demote itself to indirect. It is the responsibility of the federation manager to configure the network with no more than the maximum number of direct connections supported for that controller.

Indirect management of an element controller does not mean IP connectivity is no longer required between the network manager and the element controller it manages indirectly. In fact, IP connectivity is required to set up indirect management in the first place. IP connectivity is also required for on-demand functionality such as remote login, PM query, remote inventory, shelf level graphics, and electronic software delivery. For increased survivability, IP connectivity is required to allow the network manager to directly manage the element controller if for some reason it cannot find another network manager directly managing the specific device.

Next, some survivability scenarios are discussed for the configuration of FIG. 9.

In the event of a loss of connectivity between an indirect NM, let's say NM 40 for OPC 33, and its client NM 80, the client will attempt to reconnect indirectly via another manager whose principally configured as a direct manager. This is accomplished by requesting the list of connected network managers from CNS 62 of OPC 33, and posting a request to the preferred server.

If there are no direct managers available, for example NM 30 is turned "off", NM 80 will attempt to reluctantly promote itself to direct management of OPC 33 if there are any connections available.

The role of ICM 38 continues after recovery by continuously attempting to recover a connection via an indirect path. When a route becomes available, a switch over is completed without presenting a loss of connectivity to depending applications. By always attempting a return to this steady state, some level of control over communicating entities is preserved.

It is to be noted that this switch over may also impact other workstations in the federation, who may be managing indirectly via the reluctantly promoted path. The switch over is mandatory, although all attempts will be made to re-establish routes without presenting a loss of connectivity to the application.

In the event of a direct NM, such as NM 30 losing connectivity to an OPC/MOA, such as OPC 33, the indirect clients NM 70 and NM 80 will be notified. A client, say NM 80 will then attempt to connect to OPC/MOA 33 and establish a connection via an alternate route, for example through directly connected NM 70, hence surviving a connectivity problem due to a network outage that only affected its current indirect server. If there is no TCP/IP connectivity between the indirect client workstation and the controller (i.e. the controller is down, or invisible due to the same network outage), it will continue to attempt indirect connections until a path becomes available.

In the event of a network manager outage, it is possible for more than one federated network manager to establish a direct reluctantly promoted connection to the same controller. Because this may affect federation engineering, it is an undesirable state.

To overcome this state, reluctantly promoted connections in the federation continuously attempt to demote themselves, although one reluctantly promoted direct connection must always remain to ensure one server is available for the federation.

Other specifications for the network managers that should be noted follow.

If an optimal route is not available at the time of connection resulting in the selection of another path, the ICM will not revert once the optimal path becomes available.

Also of note is that multiple Ethernet interfaces are not supported; if a workstation is part of multiple sub-networks due to more than one LAN interface, the preferred path will only be discovered if this is true because of the first or default interface, as specified in the IP host map.

When specifying indirect management for a span which contains both a primary and a backup controller, an attempt will be made to use the same indirect server for both the primary and backup controllers. Otherwise, the connection path for each controller is determined separately, which may result in the primary and backup getting their management information from different indirect servers, or even both or one of the pair reluctantly promoting itself to satisfy its desire to find a path to that controller.

The architecture allows for the future evolution of the messaging interface between the NM and the controller which will allow the indirect server to communicate addressing information about indirect clients to the controller, allowing the indirect clients to make login requests directly to the OPC or MOA.

Because of the increased amount of data required to setup a large federation interested in most or all of each others directly managed spans, a tool could be provided to remotely retrieve the preferred directly managed spans of any network manager in the federation and apply any or all of those spans as preferred indirect in the local network manager's domain.

Several areas of functional improvements are possible beyond the above description, as the previously mentioned load balancing when surviving a failure. The load on each NM is defined by the number of controllers it directly manages. This is configured manually by the user in the GNE and can be re-defined at any time, so that all NM directly manage their fair share of OPCs.

In a true load balancing application, after a recovery has been completed, the network managers will communicate their current loads and hand-off direct management of element controllers to less heavily loaded workstations until a uniform load is achieved. This hand-off should not impact functionality and should be transparent to GNB users.

In indirect management there is no balancing, the load is distributed randomly based on which network manager is the first to claim a direct connection to each OPC, influenced by the network topology and the distribution of the network managers within that topology. It is anticipated that given the random nature of this algorithm, a uniform distribution will be achieved.

While the invention has been described with reference to particular example embodiments, further modifications and improvements which will occur to those skilled in the art, may be made within the purview of the appended claims, without departing from the scope of the invention in its broader aspect.

We claim:

1. A method of managing an element controller (EC) of a communications network comprising a first network manager (NM1) logically connected to the EC via a direct management path for direct management of the EC by the NM1, the method comprising the steps of:
   a) dynamically selecting, from at least two management paths, a preferred management path between a second network manager (NM2) and the EC; and
   b) establishing a logical connection between the NM2 and the EC over the selected preferred management path to enable management of the EC by the NM2.

2. A method as claimed in claim 1, wherein the at least two management paths comprise one or more of: an indirect management path via a federated connection between the NM2 and the NM1; and a reluctantly promoted direct management path between the NM2 and the EC.

3. A method as claimed in claim 2, wherein the step of dynamically selecting a preferred management path comprises the steps of, from the NM2:
   a) querying the EC to obtain information identifying the NM1;
   b) determining if the NM1 is directly managing the EC;
   c) if the NM1 is directly managing the EC, selecting the preferred management path as the indirect management path via the federated connection between the NM2 and the NM1;
   d) if the NM1 is not directly managing the EC:
      i) assuming a reluctantly promoted state at the NM2 to enable direct management of the EC by the NM2; and
      ii) selecting the preferred management path as the reluctantly promoted direct management path between the NM2 and the EC.

4. A method as claimed in claim 3, further comprising, if the NM1 is not directly managing the EC, the step of periodically attempting to demote the NM2 from the reluctantly promoted state.

5. A method as claimed in claim 4, wherein the step of periodically attempting to demote the NM2 comprises the steps of:
   a) periodically determining if the NM1 has recovered direct management of the EC; and
   b) when the NM1 has recovered direct management of the EC:
      i) demoting the reluctantly promoted state of the NM2; and
      ii) selecting the preferred management path as the indirect management path via the federated connection between the NM2 and the NM1.

6. A method as claimed in claim 2, wherein, when the preferred management path is the indirect management path via a federated connection, the step of establishing a logical connection over the preferred management path comprises the steps of:

a) establishing the federated connection between the NM2 and the NM1, the NM2 acting as an indirect client for the NM1, and the NM1 acting as an indirect server for the NM2; and b) establishing a logical connection between the NM2 and the EC through the NM1 using the federated connection.

7. A method as claimed in claim 3, wherein the step of querying the EC comprises the steps of:

a) sending a query message to the EC, and receiving a response message from the EC containing information identifying each network manager logically connected to the EC over a direct management path; and b) selecting the information identifying the NM1 from among the information identifying each network manager logically connected to the EC over a direct management path.

8. A method as claimed in claim 3, wherein the step of determining if the NM1 is available for communication with the EC comprises the steps of:

a) sending a connection request message to the NM1 and awaiting a response message from the MN1;

b) if the response message is received from the MN1, determining that the NM1 is available; and c) otherwise, determining that the NM1 is not available.

9. A method of federating first and second communications networks comprising a respective plurality of element controllers (ECs) logically connected to a corresponding network manager (NM) over respective direct management paths for direct management of the EC's by the corresponding NM, the method comprising the steps of:

a) dynamically selecting, from at least two management paths, a preferred management path between an element controller (EC2) of the second network and a network manager (NM1) of the first network; and b) establishing a logical connection between the NM1 and the EC2 over the selected preferred management path, to enable management of the EC2 by the NM1.

10. A method as claimed in claim 9, wherein the at least two management paths comprise one or more of: an indirect management path via a federated connection between the NM1 and a network manager (NM2) of the second network logically connected to the EC2 over a direct management path; and a reluctantly promoted direct management path between the NM1 and the EC2.

11. A method as claimed in claim 10, wherein the step of dynamically selecting a preferred management path comprises the steps of, from the NM1:

a) querying the EC2 to obtain information identifying the NM2;

b) determining if the NM2 is directly managing the EC2;

c) if the NM2 is directly managing the EC2, selecting the preferred management path as the indirect management path via the federated connection between the NM1 and the NM2;

d) if the NM2 is not directly managing the EC2:

i) assuming a reluctantly promoted state at the NM1 to enable direct management of the EC2 by the NM1; and ii) selecting the preferred management path as the reluctantly promoted direct management path between the NM1 and the EC2.

12. A method as claimed in claim 11, further comprising, if the NM2 is not directly managing the EC2, the step of periodically attempting to demote the NM1 from the reluctantly promoted state.

13. A method as claimed in claim 12, wherein the step of periodically attempting to demote the NM1 comprises the steps of:

a) periodically determining if the NM2 has recovered direct management of the EC2; and ii) when the NM2 has recovered direct management of the EC2:

ii) demoting the reluctantly promoted state of the NM1; and ii) selecting the preferred management path as the indirect management path via the federated connection between the NM1 and the NM2.

14. A method as claimed in claim 11, wherein the step of querying the EC comprises:

a) sending a query message to the EC2, and receiving a response message from the EC2 containing information identifying each network manager logically connected to the EC2 over a direct management path; and 68) selecting the information identifying the NM2 from among the information identifying each network manager logically connected to the EC2 over a direct management path.

15. A method as claimed in claim 11, wherein the step of determining if the NM2 is available for communication with the EC2 comprises the steps of:

a) sending a connection request message to the NM2 and waiting for a response message from the MN2;

b) if the response message is received from the MN2, determining that the NM2 is available; and c) otherwise, determining that the NM2 is not available.

16. A method as claimed in claim 11, wherein, when the preferred management path is the indirect management path via a federated connection, the step of establishing a logical connection over the preferred management path comprises:

a) establishing a federated connection between the NM1 and the NM2, the NM1 acting as an indirect client for the NM2, and the NM2 acting as an indirect server for the NM1; and 69) establishing a logical connection between the NM1 and the EC2 through the NM2 using the federated connection.

17. A scalable communication network having a plurality of element controllers (ECs) adapted to control operations of a respective plurality of network elements, and two or more network managers (NMs) adapted for managing each of the element controllers (ECs), the network comprising:

a) a first network manager (NM1) logically connected to a first element controller (EC1) via a direct management path for direct management of the EC1 by the NM1; and b) a second network manager (NM2) adapted to:

i) dynamically select, from at least two management paths, a preferred management path between the NM2 and the EC1; and 70) establish a logical connection between the NM2 and the EC1 over the selected preferred management path to enable management of the EC1 by the NM2.

18. A scalable communication network as claimed in claim 17, wherein the at least two management paths comprise one or more of: an indirect management path via a federated connection between the NM2 and the NM1; and a reluctantly promoted direct management path between the NM2 and the EC1.

19. A scalable communication network as claimed in claim 18, wherein the first network manager (NM1) comprises an indirect server manger (ISM) component adapted to enable a federated connection between the first network manager (NM1) and the second network manager (NM2).

20. A scalable communication network as claimed in claim 19, wherein the indirect server manger (ISM) component is further adapted to enable a logical connection between the first element controller (EC1) and the second network manager (NM2) through the federated connection.

21. A scalable communication network as claimed in claim 18, wherein the second network manager (NM2) comprises an indirect client manager (ICM) component adapted to enable management of the first element controller (EC1) using the selected preferred management path.

22. A scalable communication network as claimed in claim 21, wherein the ICM component is adapted to dynamically select the preferred management path by:
 a) querying the EC1 to obtain information identifying the NM1 logically connected to the EC1 via a direct management path;
 b) determining if the NM1 is directly managing the EC1;
 c) if the NM1 is directly managing the EC1, selecting the preferred management path as the indirect management path via the federated connection between the NM2 and the NM1;
 d) if the NM1 is not directly managing the EC1:
  i) assuming a reluctantly promoted state to enable direct management of the EC1 by the NM2; and
  73) selecting the preferred management path as the reluctantly promoted direct management path between the NM2 and the EC1.

23. A scalable communication network as claimed in claim 22, wherein, if the NM1 is not directly managing the EC1, the ICM component is adapted to periodically attempt to demote the NM2 from the reluctantly promoted state.

24. A scalable communication network as claimed in claim 23, wherein the ICM component is adapted to periodically attempt to demote the NM2 by:
 a) periodically determining if the NM1 has recovered direct management of the EC; and
 b) when the NM1 has recovered direct management of the EC:
  i) demoting the reluctantly promoted state of the NM2; and
  75) selecting the preferred management path as the indirect management path via the federated connection between the NM2 and the NM1.

25. A scalable communication network as claimed in claim 17, wherein each element controller comprises a respective collector name server including information identifying each network manager to which the element controller is logically connected over a direct management path.

26. A scalable communication network as claimed in claim 25, wherein the collector name server is responsive to a query from the NM1 to send a response message to the NM1 containing the information identifying each network manager to which the element controller is logically connected over a direct management path.

27. A scalable communication network as claimed in claim 17, wherein each network manager (NM) comprises a respective indirect access database (IAD) including information respecting devices to which the network manager can logically connect.

28. A scalable communication network as claimed in claim 27, wherein the IAD further comprises information identifying other network managers from which connection requests will be accepted to permit indirect management of any element controllers directly managed by the respective network manager (NM).

29. A scalable communication network as claimed in claim 28, wherein the IAD further comprises a list of paths available for selection as a preferred management path to enable management of an element controller.

30. A self healing communication network in which a plurality of element controllers (ECs) are connected for controlling operations of a respective plurality of network elements, and two or more network managers (NMs) are adapted for managing each of the element controllers (ECs), the network comprising:
 a) a first network manager (NM1) logically connected to a first element controller (EC1) over a direct management path for direct management of the first element controller (EC1); and
 b) connection means adapted for:
  i) dynamically selecting, from at least two management paths, a preferred management path between the EC1 and a second network manager NM2; and
  77) establish a logical connection between the NM2 and the EC over the selected preferred management path to enable management of the EC1 by the NM2.

31. A self healing communication network as claimed in claim 30, wherein the at least two management paths comprise one or more of: an indirect management path via a federated connection between the NM2 and the NM1; and a reluctantly promoted direct management path between the NM2 and the EC.

32. A self healing communication network as claimed in claim 31, wherein the connection means further comprises an indirect server manger (ISM) component operatively connected to the first network manager (NM1), the ISM component being adapted to enable a federated connection between the second network manager (NM2) and the first network manager (NM1).

33. A self healing communication network as claimed in claim 31, wherein the connection means further comprises an indirect client manager (ICM) component operatively connected to the second network manager (NM2), the ICM component being adapted to enable management of the first element controller (EC1) over the selected preferred management path.

34. A self healing communication network as claimed in claim 33, wherein the ICM component is adapted to dynamically select the preferred management path by:
 a) querying the EC1 to obtain information identifying the NM1 logically connected to the EC1 via a direct management path;
 b) determining if the NM1 is directly managing the EC1;
 c) if the NM1 is directly managing the EC1, selecting the preferred management path as the indirect management path via a federated connection between the NM2 and the NM1;
 d) if the NM1 is not directly managing the EC1:
  i) assuming a reluctantly promoted state to enable direct management of the EC1 by the NM2; and
  ii) selecting the preferred management path as the reluctantly promoted direct management path between the NM2 and the EC1.

35. A self healing communication network as claimed in claim 34, wherein, if the NM1 is not directly managing the EC1, the ICM component is adapted to periodically attempt to demote the NM2 from the reluctantly promoted state.

36. A self healing communication network as claimed in claim 35, wherein the ICM component is adapted to periodically attempt to demote the NM2 by:

a) periodically determining if the NM1 has recovered direct management of the EC; and
   b) when the NM1 has recovered direct management of the EC:
      i) demoting the reluctantly promoted state of the NM2; and
      ii) selecting the preferred management path as the indirect management path via the federated connection between the NM2 and the NM1.

37. A self healing communication network as claimed in claim 30, wherein the connection means comprises a collector name server including information respecting each network manager (NM) logically connected to the first element controller (EC1) over a direct management path.

38. A self healing communication network as claimed in claim 37, wherein an instance of the collector name server is operatively connected to the first element controller ($EC_1$).

39. A self healing communication network as claimed in claim 37, wherein the connection means further comprises an indirect access database (IAD) including information respecting devices to which a respective network manager can connect.

40. A self healing communication network as claimed in claim 39, wherein the IAD further comprises means for identifying other network managers from which connection requests will be accepted to permit indirect management of any element controllers directly managed by the respective network manager (NM).

41. A self healing communication network as claimed in claim 40, wherein the IAD further comprises means for determining management paths available for selection as the preferred management path to enable management of the element controller.

42. A self healing communication network as claimed in claim 37, wherein the collector name server is responsive to a query from the NM1 to send a response message to the NM1 containing the information identifying each network manager to which the element controller is logically connected over a direct management path.

43. A network manager (NM) for managing a plurality of element controllers (ECs) of a communication network, the network manager (NM) comprising:
   a) direct connection means for logically connecting the network manager (NM) to a first element controller (EC1) over a direct management path for direct management of the first element controller (EC1); and
   b) indirect connection means adapted for:
      i) dynamically selecting, from at least two management paths a preferred management path between the NM and a second element controller EC2; and
      ii) establishing a logical connection over the preferred management path to enable management of the (EC2) by the NM.

44. A network manager as claimed in claim 43, wherein the at least two management paths comprise one or more of: an indirect management path via a federated connection between the NM and a second network manager (NM2) directly managing the EC2; and a reluctantly promoted direct management path between the NM and the EC2.

45. A network manager as claimed in claim 44, wherein the indirect connection means comprises an indirect client manger (ICM) component adapted to enable management of the EC2 by the NM over the preferred management path.

46. A network manager as claimed in claim 45, wherein the ICM component is adapted to dynamically select the preferred management path by:
   a) querying the EC2 to obtain information identifying the NM2 logically connected to the EC2 over a direct management path;
   b) determining if the NM2 is directly managing the EC2;
   c) if the NM2 is directly managing the EC2, selecting the preferred management path as the indirect management path via the federated connection between the NM and the NM2;
   d) if the NM2 is not directly managing the EC2:
      i) assuming a reluctantly promoted state to enable direct management of the EC2 by the NM; and
      ii) selecting the preferred management path as the reluctantly promoted direct management path between the NM2 and the EC2.

47. A network manager as claimed in claim 46, wherein, if the NM2 is not directly managing the EC2, the ICM component is adapted to periodically attempt to demote the NM from the reluctantly promoted state.

48. A self healing communication network as claimed in claim 47, wherein the ICM component is adapted to periodically attempt to demote the NM by:
   a) periodically determining if the NM2 has recovered direct management of the EC2; and
   b) when the NM2 has recovered direct management of the EC2:
      i) demoting the reluctantly promoted state of the NM; and
      ii) selecting the preferred management path as the indirect management path via the federated connection between the NM and the NM2.

49. A network manager as claimed in claim 44, wherein the indirect connection means further comprises an indirect server manager ISM component adapted to enable indirect management of the first element controller (EC1) by another network manager using an indirect management path via a federated connection between the other network manager and the NM.

50. A network manager as claimed in claim 45, wherein the indirect connection means further comprises an indirect access database (IAD) including information respecting devices to which the network manager can connect.

51. A network manager as claimed in claim 50, wherein the IAD further comprises, in respect of each device to which the network manager can connect, information respecting a preferred connection path.

52. A network manager as claimed in claim 51, wherein the IAD further comprises means for determining other network managers from which connection requests will be accepted to permit indirect management of any element controllers directly managed by the network manager (NM).

* * * * *